(12) United States Patent
Saita et al.

(10) Patent No.: US 8,040,611 B2
(45) Date of Patent: *Oct. 18, 2011

(54) COLOR SEPARATION OPTICAL SYSTEM AND IMAGE PICKUP APPARATUS

(75) Inventors: Arihiro Saita, Saitama (JP); Shuji Akiya, Saitama (JP)

(73) Assignee: Fujinon Corporation, Saitama (JP)

( * ) Notice: Subject to any disclaimer, the term of this patent is extended or adjusted under 35 U.S.C. 154(b) by 499 days.

This patent is subject to a terminal disclaimer.

(21) Appl. No.: 12/208,860

(22) Filed: Sep. 11, 2008

(65) Prior Publication Data

US 2009/0086324 A1   Apr. 2, 2009

(30) Foreign Application Priority Data

Sep. 28, 2007   (JP) .................. P2007-254184

(51) Int. Cl.
  *G02B 27/14* (2006.01)
  *G02B 5/04* (2006.01)
  *G03B 13/00* (2006.01)

(52) U.S. Cl. .................. 359/634; 359/831; 348/338
(58) Field of Classification Search .................. 359/634, 359/602, 605, 606, 629, 831, 638, 639, 833, 359/837, 839, 850; 348/336, 335, 338, 339, 348/57–58, 62; 353/31, 33–34, 82, 84; 349/8
See application file for complete search history.

(56) References Cited

U.S. PATENT DOCUMENTS

| | | | |
|---|---|---|---|
| 2,945,413 A * | 7/1960 | Kelly .............................. 359/583 |
| 3,602,637 A | 8/1971 | Katsuta et al. |
| 3,802,763 A | 4/1974 | Cook et al. |
| 3,905,684 A | 9/1975 | Cook et al. |
| 3,932,027 A | 1/1976 | Cook et al. |
| 4,084,179 A | 4/1978 | Sekiguchi |
| 4,589,015 A * | 5/1986 | Nakata et al. ................. 348/259 |
| 6,078,429 A | 6/2000 | Lyon |
| 6,404,552 B1 | 6/2002 | Manabe |
| 6,698,893 B2 | 3/2004 | Takimoto et al. |

(Continued)

FOREIGN PATENT DOCUMENTS

GB   1251482 A   10/1971

(Continued)

OTHER PUBLICATIONS

Extended European Search Report in European Application No. 08015956.9 mailed Apr. 5, 2011.
U.S. Office Action issued Mar. 11, 2010, in co-pending application U.S. Appl. No. 12/049,902.

*Primary Examiner* — Dawayne Pinkney
(74) *Attorney, Agent, or Firm* — Birch, Stewart, Kolasch & Birch, LLP

(57) ABSTRACT

It is disclosed that a color separation optical system improves color reproducibility by obtaining a characteristic which approximates an ideal spectral characteristic in view of influence of polarization separation caused according to the magnitude of an incidence angle. In the color separation optical system, a curve representing a characteristic of a green-reflecting dichroic film DG has a shape along the characteristic curve representing an ideal spectral characteristic corresponding to green light. Further, the characteristic of the blue-reflecting dichroic film DB is associated with that of the green-reflecting dichroic film DG. A part, in which the transmittance of the blue-reflecting dichroic film DB changes from a low transmittance to a high transmittance, in the transmittance characteristic curve representing the characteristic of the blue-reflecting dichroic film DB is included in a predetermined wavelength region associated with the characteristic of the green-reflecting dichroic film DG.

24 Claims, 22 Drawing Sheets

U.S. PATENT DOCUMENTS

| | | |
|---|---|---|
| 7,165,846 B2 | 1/2007 | Sannohe |
| 7,411,734 B2 | 8/2008 | Magarill et al. |
| 7,518,803 B2 | 4/2009 | Sawai et al. |
| 7,575,325 B2 | 8/2009 | Suzuki et al. |
| 2006/0279846 A1 | 12/2006 | Ring et al. |
| 2009/0086324 A1 | 4/2009 | Saita et al. |

FOREIGN PATENT DOCUMENTS

| | | |
|---|---|---|
| JP | 2005-208256 A | 8/2005 |
| WO | WO 02/102087 A1 | 12/2002 |

* cited by examiner

SPECTRAL TRANSMISSION CHARACTERISTICS (PRISM PORTION)

FIG.6

| EXAMPLE OF DESIGN OF FILM DG ||||
|---|---|---|---|
| LAYER | FILM MATERIAL | REFRACTIVE INDEX | FILM THICKNESS (nm) |
| 1 | $Nb_2O_5$ | 2.35 | 7 |
| 2 | $SiO_2$ | 1.48 | 22 |
| 3 | $Nb_2O_5$ | 2.35 | 185 |
| 4 | $SiO_2$ | 1.48 | 33 |
| 5 | $Nb_2O_5$ | 2.35 | 103 |
| 6 | $SiO_2$ | 1.48 | 24 |
| 7 | $Nb_2O_5$ | 2.35 | 91 |
| 8 | $SiO_2$ | 1.48 | 26 |
| 9 | $Nb_2O_5$ | 2.35 | 99 |
| 10 | $SiO_2$ | 1.48 | 35 |
| 11 | $Nb_2O_5$ | 2.35 | 104 |
| 12 | $SiO_2$ | 1.48 | 19 |
| 13 | $Nb_2O_5$ | 2.35 | 101 |
| 14 | $SiO_2$ | 1.48 | 23 |
| 15 | $Nb_2O_5$ | 2.35 | 109 |
| 16 | $SiO_2$ | 1.48 | 27 |
| 17 | $Nb_2O_5$ | 2.35 | 106 |
| 18 | $SiO_2$ | 1.48 | 24 |
| 19 | $Nb_2O_5$ | 2.35 | 106 |
| 20 | $SiO_2$ | 1.48 | 20 |
| 21 | $Nb_2O_5$ | 2.35 | 107 |
| 22 | $SiO_2$ | 1.48 | 32 |
| 23 | $Nb_2O_5$ | 2.35 | 113 |
| 24 | $SiO_2$ | 1.48 | 27 |
| 25 | $Nb_2O_5$ | 2.35 | 102 |
| 26 | $SiO_2$ | 1.48 | 15 |
| 27 | $Nb_2O_5$ | 2.35 | 114 |
| 28 | $SiO_2$ | 1.48 | 31 |
| 29 | $Nb_2O_5$ | 2.35 | 122 |
| 30 | $SiO_2$ | 1.48 | 21 |
| 31 | $Nb_2O_5$ | 2.35 | 188 |
| 32 | $SiO_2$ | 1.48 | 23 |
| 33 | $Nb_2O_5$ | 2.35 | 13 |
| 34 | $SiO_2$ | 1.48 | 134 |

FIG.7

| FIRST EXAMPLE OF DESIGN OF FILM DB | | | |
|---|---|---|---|
| LAYER | FILM MATERIAL | REFRACTIVE INDEX | FILM THICKNESS (nm) |
| 1 | $Nb_2O_5$ | 2.39 | 29 |
| 2 | $SiO_2$ | 1.48 | 74 |
| 3 | $Nb_2O_5$ | 2.39 | 48 |
| 4 | $SiO_2$ | 1.48 | 93 |
| 5 | $Nb_2O_5$ | 2.39 | 45 |
| 6 | $SiO_2$ | 1.48 | 98 |
| 7 | $Nb_2O_5$ | 2.39 | 48 |
| 8 | $SiO_2$ | 1.48 | 100 |
| 9 | $Nb_2O_5$ | 2.39 | 47 |
| 10 | $SiO_2$ | 1.48 | 100 |
| 11 | $Nb_2O_5$ | 2.39 | 48 |
| 12 | $SiO_2$ | 1.48 | 101 |
| 13 | $Nb_2O_5$ | 2.39 | 48 |
| 14 | $SiO_2$ | 1.48 | 101 |
| 15 | $Nb_2O_5$ | 2.39 | 49 |
| 16 | $SiO_2$ | 1.48 | 97 |
| 17 | $Nb_2O_5$ | 2.39 | 65 |
| 18 | $SiO_2$ | 1.48 | 48 |
| 19 | $Nb_2O_5$ | 2.39 | 100 |
| 20 | $SiO_2$ | 1.48 | 50 |
| 21 | $Nb_2O_5$ | 2.39 | 83 |
| 22 | $SiO_2$ | 1.48 | 57 |
| 23 | $Nb_2O_5$ | 2.39 | 70 |
| 24 | $SiO_2$ | 1.48 | 68 |
| 25 | $Nb_2O_5$ | 2.39 | 85 |
| 26 | $SiO_2$ | 1.48 | 31 |
| 27 | $Nb_2O_5$ | 2.39 | 109 |
| 28 | $SiO_2$ | 1.48 | 50 |
| 29 | $Nb_2O_5$ | 2.39 | 46 |
| 30 | $SiO_2$ | 1.48 | 78 |

SECOND EXAMPLE OF DESIGN OF DICHROIC FILM

FIG.9

| SECOND EXAMPLE OF DESIGN OF FILM DB ||||
| LAYER | FILM MATERIAL | REFRAC-TIVE INDEX | FILM THICK-NESS (nm) |
| --- | --- | --- | --- |
| 1 | Nb$_2$O$_5$ | 2.31 | 30 |
| 2 | SiO$_2$ | 1.47 | 75 |
| 3 | Nb$_2$O$_5$ | 2.31 | 51 |
| 4 | SiO$_2$ | 1.47 | 90 |
| 5 | Nb$_2$O$_5$ | 2.31 | 47 |
| 6 | SiO$_2$ | 1.47 | 85 |
| 7 | Nb$_2$O$_5$ | 2.31 | 51 |
| 8 | SiO$_2$ | 1.47 | 78 |
| 9 | Nb$_2$O$_5$ | 2.31 | 43 |
| 10 | SiO$_2$ | 1.47 | 77 |
| 11 | Nb$_2$O$_5$ | 2.31 | 46 |
| 12 | SiO$_2$ | 1.47 | 77 |
| 13 | Nb$_2$O$_5$ | 2.31 | 52 |
| 14 | SiO$_2$ | 1.47 | 88 |
| 15 | Nb$_2$O$_5$ | 2.31 | 55 |
| 16 | SiO$_2$ | 1.47 | 85 |
| 17 | Nb$_2$O$_5$ | 2.31 | 57 |
| 18 | SiO$_2$ | 1.47 | 95 |
| 19 | Nb$_2$O$_5$ | 2.31 | 54 |
| 20 | SiO$_2$ | 1.47 | 82 |
| 21 | Nb$_2$O$_5$ | 2.31 | 72 |
| 22 | SiO$_2$ | 1.47 | 58 |
| 23 | Nb$_2$O$_5$ | 2.31 | 79 |
| 24 | SiO$_2$ | 1.47 | 61 |
| 25 | Nb$_2$O$_5$ | 2.31 | 78 |
| 26 | SiO$_2$ | 1.47 | 53 |
| 27 | Nb$_2$O$_5$ | 2.31 | 82 |
| 28 | SiO$_2$ | 1.47 | 57 |
| 29 | Nb$_2$O$_5$ | 2.31 | 82 |
| 30 | SiO$_2$ | 1.47 | 48 |
| 31 | Nb$_2$O$_5$ | 2.31 | 83 |
| 32 | SiO$_2$ | 1.47 | 57 |
| 33 | Nb$_2$O$_5$ | 2.31 | 81 |
| 34 | SiO$_2$ | 1.47 | 52 |
| 35 | Nb$_2$O$_5$ | 2.31 | 75 |
| 36 | SiO$_2$ | 1.47 | 52 |
| 37 | Nb$_2$O$_5$ | 2.31 | 89 |
| 38 | SiO$_2$ | 1.47 | 52 |
| 39 | Nb$_2$O$_5$ | 2.31 | 41 |
| 40 | SiO$_2$ | 1.47 | 88 |

US 8,040,611 B2

COLOR SEPARATION OPTICAL SYSTEM AND IMAGE PICKUP APPARATUS

CROSS-REFERENCE TO RELATED APPLICATIONS

This application is based on and claims priority under 35 USC 119 from Japanese Patent Application No. 2007-254184 filed Sep. 28, 2007; the entire contents of which are incorporated herein by reference.

BACKGROUND

1. Technical Field

The present invention relates to a color separation optical system for separating incident light into a plurality of color light components, and to an image pickup apparatus having the color separation optical system.

2. Related Art

Generally, image pickup apparatuses, such as a television camera and a video camera, have color separation optical systems. FIG. 17 illustrates an example of the configuration of a color separation optical system. The color separation optical system 101 separates incident light L, which is incident thereon via a taking lens 102, into three color components that are a blue light component LB, a red light component LR, and a green light component LG. Image pickup devices 4B, 4R, and 4G, such as charge coupled devices (CCDs), respectively used for the light components LB, LR, and LG, into which incident light is separated by the color separation optical system 101, are disposed at places respectively corresponding to the color light components LB, LR, and LG. The color separation optical system 101 is referred to as a Philips type color separation optical system, and is provided with a first prism 110, a second prism 120, and a third prism 130, which are arranged along an optical axis Z1 in order from the side of incidence of light. The blue light component LB, the red light component LR, and the green light component LG are taken out by the first prism 110, the second prism 120, and the third prism 130, respectively.

A blue-reflecting dichroic film DB1 is formed on a reflection/transmission surface 111 of the first prism 110. A red-reflecting dichroic film DR1 is formed on a reflection/transmission surface 121 of the second prism 120. The first prism 110 and the second prism 120 are disposed so that the surface 111 of the first prism 110, on which the blue-reflecting dichroic film DB1 is formed, and a surface of the second prism 120, on which light is incident, are spaced by an air gap 110AG and face each other. Further, a trimming filter 151 is provided on a surface of the first prism 110, from which light exits. A dichroic film 151A is formed on a surface of the trimming filter 151, from which light exits. Similarly, a trimming filter 152, on which a dichroic film 152A is formed, is provided on a surface of the second prism 120, from which light exits. A trimming filter 153, on which a dichroic film 153A is formed, is provided on a surface of the third prism 130, from which light exits. The trimming filters 151, 152, and 153 are provided in order to make the spectral characteristic of the color separation optical system approximate an ideal characteristic. The trimming filters 151, 152, and 153 have a role of shaping spectral characteristics represented by wavelength components, which are not sufficiently shaped by the blue-reflecting dichroic film DB1 and the red-reflecting dichroic film DR1.

FIG. 19 illustrates ideal spectral characteristics of a color imaging system, which respectively correspond to a red component (R-component), a blue component (B-component), and a green component (G-component). Incidentally, the ideal spectral characteristics illustrated in FIG. 19 are normalized so that the maximum value of each of the R-component, the B-component, and the C-component is 1. The "ideal spectral characteristic" can be obtained by converting the chromaticity coordinates of three primary colors of a color reproduction medium thereinto and performing a linear transformation of a color matching function in an XYZ color coordinate system. Incidentally, the "color reproduction medium" is a medium for reproduction (or display) of an image taken by an image pickup apparatus. The "color reproduction medium" is, e.g., a display apparatus such as a liquid crystal monitor and a projector. FIG. 18 illustrates an example of chromaticity coordinates of three primary colors R, G, and B for obtaining an ideal characteristic. Three primary colors R, G, and B determine a color range that can be reproduced by a color reproduction medium.

Ideal color reproduction can be achieved in a case where a characteristic, which is the same as an ideal characteristic as illustrated in FIG. 19, can be obtained using a color separation optical system 101 illustrated in FIG. 17. However, actually, it is difficult to obtain a characteristic which is completely the same as an ideal characteristic. Thus, a color separation optical system is designed to obtain a characteristic which approximates an ideal characteristic. The color separation optical system 101 is designed so that a characteristic, which approximates an ideal characteristic, is obtained by appropriately adjusting the dichroic films DB1 and DR1 respectively formed on the prisms and the dichroic films 151A, 152A, and 153A respectively formed on the trimming filters 151, 152, and 153. FIG. 20 illustrates an example of color separation optical system obtained by performing such a design.

FIG. 21 illustrates examples of the designs of the dichroic films DB1 and DR1 used in the color separation optical system 101. As illustrated in FIG. 21, films having characteristics, the wavelength-to-transmittance characteristic curves of which have steep leading edges or trailing edges as compared with those of the characteristic curves of the ideal characteristics illustrated in FIG. 19, are used as the dichroic films DB1 and DR1, respectively. Additionally, unnecessary wavelength components of light exiting from an exit surface of each of the prisms are cut off using the trimming filters 151, 152, and 153 on which the dichroic films 151A, 152A, and 153A are formed, respectively.

Thus, characteristics are arranged using various trimming filters in the color separation optical system. For example, Patent Document 1 (JP-A-2005-208256) has proposed a method for improving color reproducibility by increasing the luminance level of a fresh color using a trimming filter which has a special spectral transmission characteristic. In addition, another method is known, which arranges a transmission characteristic by disposing a half mirror on a bonding surface between the second prism 120 and the third prism 130, instead of the dichroic film DR1, and providing dichroic films having transmission characteristics, which approximate ideal characteristics, as the trimming filters 152 and 153. FIG. 22 illustrates a spectral characteristic of a color separation optical system, which is made by a special arrangement to approximate an ideal characteristic.

However, the color separation optical system using a trimming filter provided with a dichroic film on an exit surface of a prism has a wavelength range, in which a reflectance is high in some wavelengths, as a characteristic of the dichroic film. Consequently, the above color separation optical system has problems in that multiple reflections occur between the dichroic surface and an imaging surface and result in occurrence of ghost flare, and that picture quality is degraded. FIG. 23 illustrates multiple reflections occurring at the side of an exit surface of the third prism 130, from which green light LG is taken out, in the color separation optical system 101, by way of example. As illustrated in FIG. 23, the image pickup device 4G has an imaging surface 401G, a cover glass 402, and an extraction electrode 403. For example, a part of green light LG passing through the trimming filter 153 for green light is reflected by the imaging surface 401G. Then, the return light reflected therefrom is reflected by the dichroic film 153A provided on the trimming filter 153 according to the wavelength selectivity characteristic of the dichroic film 153A. Thus, multiple reflection light 160 is generated to thereby cause ghost flare. Accordingly, hitherto, it is difficult to implement an imaging system having an ideal spectral characteristic, which reduces ghost flare.

Further, although FIG. 17 illustrates the Philips type color separation optical system 101 in which the first prism 110 and the second prism 120 are disposed by interposing the air gap 110AG therebetween, particularly, a gapless type color separation optical system, which is provided without the air gap 110AG therebetween, has a problem in that polarization separation is liable to occur at a reflection dichroic surface. FIG. 24 illustrates an example of the configuration of the gapless type color separation optical system 101A. The gapless type color separation optical system 101A shown in FIG. 24 differs from the Philips type color separation optical system 101 illustrated in FIG. 17 in the order in which the color components are taken out therefrom. The color separation optical system 101A is configured so that green light LG, blue light LB, and red light LR are respectively taken out by the first prism 110, the second prism 120, and the third prism 130, respectively. In the color separation optical system 101A, a green-reflecting dichroic film DG1 adapted to reflect green light LG and to transmit blue light LB and red light LR is formed on a reflection/transmission surface 111 of the first prism 110. Moreover, a blue-reflecting dichroic film DB1 adapted to reflect blue light LB and to transmit red light LR is formed on a reflection/transmission surface 121 of the second prism 120. The surface 111 of the first prism 110, on which the green-reflecting dichroic film DG1 is provided, and an incidence surface of the second prism 120, on which light is incident, are closely attached to each other without providing an air gap therebetween.

In the case of such a gapless type color separation optical system 101A, an incidence angle θ of incidence of light on the reflection dichroic surface (blue-reflecting dichroic film DB1) of the second prism 120 increases, as compared with the Philips type color separation optical system 101. In a case where the incidence angle θ increases, a phenomenon called a "polarization separation" occurs at the blue-reflecting dichroic film DB1. Thus, as is understood from an example of a transmission characteristic curve illustrated in FIG. 25, in the blue-reflecting dichroic film DB1, a wavelength width W100 required to change the transmittance of the film DB1 from a low transmittance band to a high transmittance band has a tendency to increase in a case where the transmittance is assumed to be an average of the transmittance of P-polarized light and that of S-polarized light. It is considered to be necessary for obtaining an ideal spectral characteristic to set the wavelength width W100 in an appropriate wavelength range.

The invention is accomplished in view of such problems. An object of the invention is to provide a color separation optical system and an image pickup apparatus, which are enabled to improve color reproducibility by obtaining a characteristic which approximates an ideal spectral characteristic in view of influence of polarization separation caused according to the magnitude of an incidence angle.

SUMMARY

According to a first aspect of the invention, a color separation optical system for separating incident light into at least three color light components including green light, blue light, and red light, includes in order from a light incidence side, a first prism, a second prism and a third prism. The first prism has a first dichroic film, from which a first color light component reflected by the first dichroic film is taken out. The second prism has a second dichroic film, from which a second color light component transmitted by the first dichroic film and reflected by the second dichroic film is taken out. And a third color light component transmitted by the first and second dichroic films is taken out from the third prism. The first dichroic film is configured to reflect green light as the first color light component. The second dichroic film is configured to reflect blue light as the second color light component. The reflection characteristic curve represents a reflectance-to-wavelength characteristic of the first dichroic film has a shape so that a gradient at each point of the reflection characteristic curve changes along a short-wavelength-side ideal spectral characteristic curve of green light and a long-wavelength-side ideal spectral characteristic curve of green light. a transmission characteristic curve represents a wavelength-to-transmittance characteristic of the second dichroic film has a part in which a transmittance rises from 20% to 80% within a transmittance range between the lowest transmittance and the highest transmittance. The part, in which a transmittance rises from 20% to 80% within the transmittance range between the lowest transmittance and the highest transmittance, of the transmission characteristic curve corresponding to the second dichroic film is included in a given wavelength region interposed between wavelength points, at which a transmittance is equal to 80% between the lowest transmittance and the highest transmittance, on a transmission characteristic curve representing a wavelength-to-transmittance characteristic of the first dichroic film.

In the color separation optical system according to the first aspect of the invention, the first dichroic film is configured to reflect green light as a first color light component. Thus, green light is taken out from the first prism. Further, the second dichroic film is configured to reflect blue light as a second color light component. Thus, blue light is taken out from the second prism. A third color light component (color light component differing from the first color light component and the second color light component) transmitted by the first dichroic film and the second dichroic film is taken out from the third prism. In this case, a curve representing the characteristic of the first dichroic film has a shape configured so that the gradient at each point on the curve changes along the ideal green spectral characteristic curve. Thus, a characteristic close to the ideal spectral characteristic can be obtained without providing a trimming filter provided with a dichroic film on the exit surface of the prism. Consequently, there is no necessity for using the trimming filter provided with the dichroic film. Accordingly, the generation of ghost flare, which has hitherto been caused due to the dichroic film provided on the trimming filter, is suppressed. Thus, an imaging system having an ideal spectral characteristic, which reduces ghost flare, can be implemented.

Furthermore, in this color separation optical system, the characteristic of the second dichroic film is associated with that of the first dichroic film. A part, in which the transmittance changes from a low transmittance to a high transmittance, of the transmission characteristic curve of the second dichroic film is included a given wavelength region associated with the characteristic of the first dichroic film. Consequently, even when polarization separation occurs at the second dichroic film, the influence of the polarization separation is substantially confined in the given wavelength region associated with the characteristic of the first dichroic film. Accordingly, a characteristic close to the ideal spectral characteristic can be obtained.

According to a second aspect of the invention, a color separation optical system for separating incident light into at least three color light components including green light, blue light, and red light, comprising in an order from a light incidence side, a first prism, a second prism and a third prism. The first prism has a first dichroic film, from which a first color light component reflected by the first dichroic film is taken out. The second prism has a second dichroic film, from which a second color light component transmitted by the first dichroic film and reflected by the second dichroic film is taken out. And a third color light component transmitted by the first and second dichroic films is taken out the third prism. The first dichroic film is configured to reflect green light as the first color light component. The second dichroic film is configured to reflect blue light as the second color light component. The reflection characteristic curve represents a reflectance-to-wavelength characteristic of the first dichroic film has a shape so that a gradient at each point of the reflection characteristic curve changes along a short-wavelength-side ideal spectral characteristic curve of green light and a long-wavelength-side ideal spectral characteristic curve of green light. A reflection characteristic curve representing a wavelength-to-reflectance characteristic of the second dichroic film has a part in which a reflectance rises from 20% to 80% within a reflectance range between the lowest reflectance and the highest reflectance. The part, in which the reflectance rises from 20% to 80% within the reflectance range between the lowest reflectance and the highest reflectance, of the reflectance characteristic curve corresponding to the second dichroic film is included in a given wavelength region interposed between wavelength points, at which a transmittance is equal to 80% between the lowest transmittance and the highest transmittance, on a transmission characteristic curve representing a wavelength-to-transmittance characteristic of the first dichroic film.

In the color separation optical system according to the second aspect of the invention, the first dichroic film is configured to reflect green light as a first color light component. Thus, green light is taken out from the first prism. Further, the second dichroic film is configured to reflect red light as a second color light component. Thus, red light is taken out from the second prism. A third color light component (color light component differing from the first color light component and the second color light component) transmitted by the first dichroic film and the second dichroic film is taken out from the third prism. In this case, a curve representing the characteristic of the first dichroic film has a shape configured so that the gradient at each point on the curve changes along the ideal green spectral characteristic curve. Thus, a characteristic close to the ideal spectral characteristic can be obtained without providing a trimming filter provided with a dichroic film on the exit surface of the prism. Consequently, there is no necessity for using the trimming filter provided with the dichroic film. Accordingly, the generation of ghost flare, which has hitherto been caused due to the dichroic film provided on the trimming filter, is suppressed. Thus, an imaging system having an ideal spectral characteristic, which reduces ghost flare, can be implemented.

Furthermore, in this color separation optical system, the characteristic of the second dichroic film is associated with that of the first dichroic film. A part, in which the transmittance changes from a low transmittance to a high transmittance, of the transmission characteristic curve of the second dichroic film is included a given wavelength region associated with the characteristic of the first dichroic film. Consequently, even when polarization separation occurs at the second dichroic film, the influence of the polarization separation is substantially confined in the predetermined wavelength region associated with the characteristic of the first dichroic film. Accordingly, a characteristic close to the ideal spectral characteristic can be obtained.

Incidentally, in the color separation optical system according to the first or second aspect, a surface of the first prism, on which the first dichroic film is provided, and a light incidence surface of the second prism are closely attached to each other without providing an air gap therebetween. Thus, the color separation optical system according to the first or second aspect may be what is called a gapless type color separation optical system.

Preferably, the color separation optical system according to the first or second aspect can be configured as follows. That is, the first dichroic film has a shape configured so that a gradient at each point on the reflection characteristic curve changes along a short-wavelength-side ideal spectral characteristic curve of green light, in which the reflectance changes from a low value to a high value, in a range of a wavelength from 430 nm to 670 nm. Further, the first dichroic film has a shape configured so that the gradient at each point on the reflection characteristic curve changes along a long-wavelength-side ideal spectral characteristic curve of green light, in which the reflectance changes from a high value to a low value, in a range of a wavelength from 430 nm to 670 nm.

Incidentally, in the color separation optical system according to the first or second aspect, the "ideal spectral characteristic" is a "given target spectral characteristic", e.g., an ideal characteristic represented by a color matching function in an RGB color coordinate system. Alternatively, the "ideal spectral characteristic" may be an ideal characteristic represented by converting chromaticity coordinates of three primary colors of a color reproduction medium thereinto and performing a linear transformation of a color matching function in an XYZ color coordinate system.

Further, the color separation optical system according to the first or second aspect may further include an absorption filter that is disposed at a more front side than the first prism or at an exit surface side of the prism, from which red light is taken out, and that has a characteristic close to a visibility curve. Alternatively, the color separation optical system according to the first or second aspect may further include a coating type infrared cut filter disposed at a more front side than the first prism and configured to cut off infrared light. Alternatively, the color separation optical system according to the first or second aspect may further include an ultraviolet cut filter disposed at a more front side than the first prism and configured to cut off ultraviolet light. Alternatively, the color separation optical system according to the first or second aspect may further include a depolarizing plate provided at a more front side than the first prism to depolarize light polarized in a specific direction of incident light. Alternatively, the color separation optical system according to the first or second aspect may further include an absorption filter provided on a light exit surface side of a prism, from which red light is taken out, to cut off blue light and green light and to transmit red light.

Consequently, a characteristic close to the ideal spectral characteristic can easily be obtained.

Further, in the color separation optical system according to the first or second aspect, an antireflection film may be applied to a light exit surface of at least one prism. Consequently, the color separation optical system according to the first or second aspect can be more advantageous in reducing ghost flare.

An image pickup apparatus according to the invention includes the color separation optical system according to the first or second aspect, and an image pickup device provided corresponding to each of color light components, into which incident light is separated by the color separation optical system, to output an electric signal corresponding to each of the color light components that are incident thereon.

Thus, the image pickup apparatus according to the invention can obtain high-color-reproducibility imaging signals based on each color light component obtained by the color separation optical system according to the invention.

The color separation optical system according to the first aspect is configured as follows. That is, green light reflected by the first dichroic film is taken out from the first prism as the first color component. In addition, blue light reflected by the second dichroic film is taken out as the second color light component from the second prism. A curve representing the characteristic of the first dichroic film is set to have a shape the gradient at each point on which changes along the ideal green spectral characteristic curve. Thus, a characteristic close to the ideal spectral characteristic can be obtained without using a trimming filter having a dichroic film provided on the exit surface of the prism. Consequently, ghost flare can be reduced, as compared with the aforementioned wavelength-selecting technique. In addition, the color reproducibility can be enhanced by obtaining a characteristic close to the ideal spectral characteristic. Further, in the color separation optical system according to the first aspect, the characteristic of the second dichroic film is associated with that of the first dichroic film. A part, in which the transmittance is changed from a low value to a high value, in the transmission characteristic curve of the second dichroic film is included in a given wavelength region associated with the characteristic of the first dichroic film. Thus, even when polarization separation occurs at the second dichroic film, the influence of the polarization separation is substantially confined in the given wavelength region associated with the characteristic of the first dichroic film. Accordingly, even when polarization separation occurs at the second dichroic film, a characteristic close to the ideal characteristic can be obtained.

The color separation optical system according to the second aspect is configured as follows. That is, green light reflected by the first dichroic film is taken out as the first color component from the first prism. Further, red light reflected by the second dichroic film is taken out as the second color light component from the second prism. A curve representing the characteristic of the first dichroic film is set to have a shape the gradient at each point on which changes along the ideal green spectral characteristic curve. Thus, a characteristic close to the ideal spectral characteristic can be obtained without using a trimming filter having a dichroic film provided on the exit surface of the prism. Consequently, ghost flare can be reduced, as compared with the aforementioned wavelength-selecting technique. In addition, the color reproducibility can be enhanced by obtaining a characteristic close to the ideal spectral characteristic. Further, the characteristic of the second dichroic film is associated with that of the first dichroic film. A part, in which the transmittance is changed from a low value to a high value, in the transmission characteristic curve of the second dichroic film is included in a given wavelength region associated with the characteristic of the first dichroic film. Thus, even when polarization separation occurs at the second dichroic film, the influence of the polarization separation is substantially confined in the given wavelength region associated with the characteristic of the first dichroic film. Accordingly, even when polarization separation occurs at the second dichroic film, a characteristic close to the ideal characteristic can be obtained.

The image pickup apparatus according to the invention outputs imaging signals according to color light components obtained by a high performance color separation optical system according to the invention. Consequently, imaging can be achieved with high color reproducibility.

BRIEF DESCRIPTION OF THE DRAWINGS

FIG. 6 is a table illustrating an example of numerical value data on the film design of a green-reflecting dichroic film DG used in the color separation optical system according to the first embodiment of the invention.

FIG. 7 is a table illustrating a first example of numerical value data on the film design of a blue-reflecting dichroic film DB used in the color separation optical system according to the first embodiment of the invention.

FIG. 9 is a table illustrating a second example of numerical value data on the film design of the blue-reflecting dichroic film DB used in the color separation optical system according to the first embodiment of the invention.

DETAILED DESCRIPTION

Hereinafter, embodiments of the invention are described in detail with reference to the accompanying drawings.

First Embodiment

Figure 1:
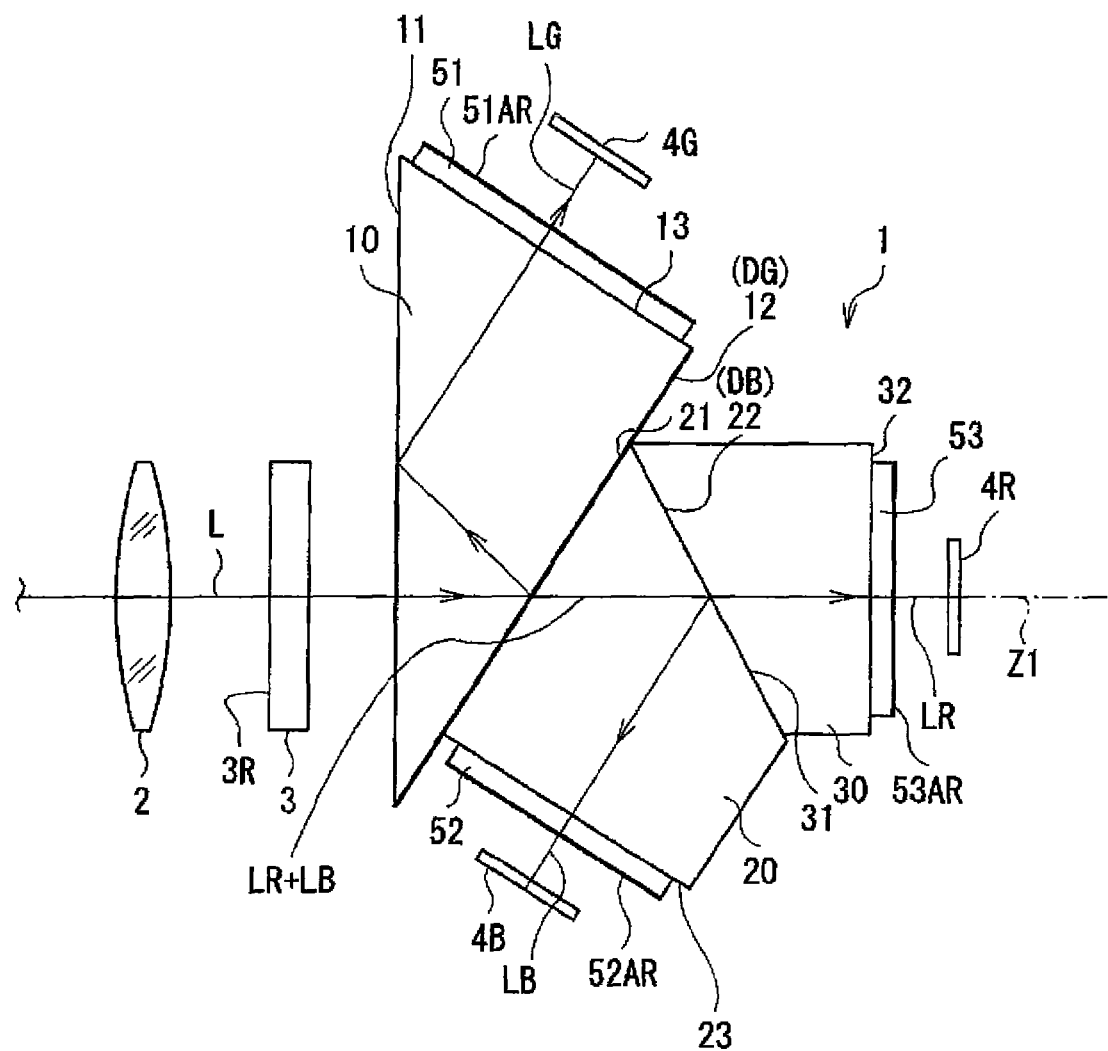
FIG. 1 is a cross-sectional view illustrating an image pickup apparatus having a color separation optical system according to a first embodiment of the invention.

FIG. 1 is a cross-sectional view illustrating the configuration of a part of an imaging apparatus having a color separation optical system 1 according to a first embodiment of the invention. This imaging apparatus is utilized as an imaging portion of a television camera. The color separation optical system 1 separates incident light L, which is incident thereon via an imaging lens 2, into three color components, i.e., a blue light component LB, a red light component LR, and a green light component LG. Image pickup devices 4B, 4R, and 4G, such as CCDs, respectively corresponding to the light components LB, LR, and LG, to which the incident light is separated by the color separation optical system 1, are disposed at places respectively corresponding to the light components LB, LR, and LG. The color separation optical system 1 includes an infrared (IR) cut filter 3, a first prism 10, a second prism 20, and a third prism 30, which are arranged from a light incidence side along an optical axis Z1 in this order. The color separation optical system 1 according to the present embodiment has an example of a configuration in which green light LG is taken out by the first prism 10, in which blue light LB is taken out by the second prism 20, and in which red light LR is taken out by the third prism 30.

The first prism 10 has a first surface 11, a second surface 12, and a third surface 13. The third surface 13 of the first prism 10 is a light exit surface. A trimming filter 51 is provided on the exit surface. The trimming filter 51 is not provided with a dichroic film for adjusting a characteristic. An antireflection film 51AR for preventing occurrence of ghost flare is formed on a light exit surface of the trimming filter 51, instead of the dichroic film. Incidentally, it is useful to form the antireflection film 51AR directly on the third surface 13 of the first prism 10 without providing a trimming filter 51 thereon.

Figure 19:
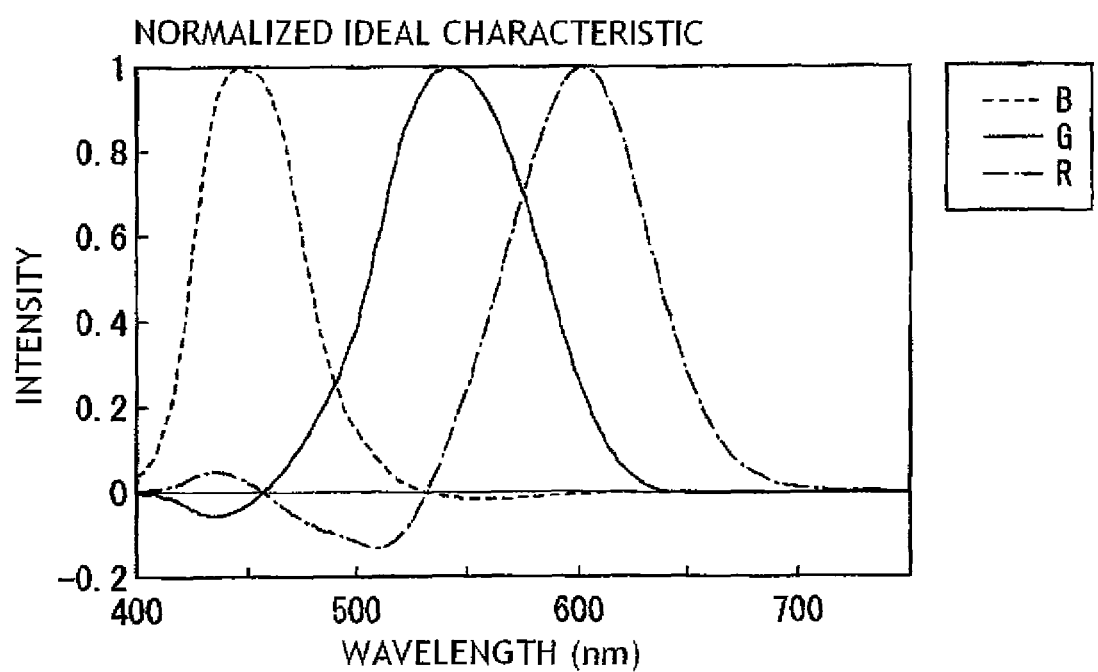
FIG. 19 is a characteristic graph illustrating a normalized ideal characteristic.
Figure 20:
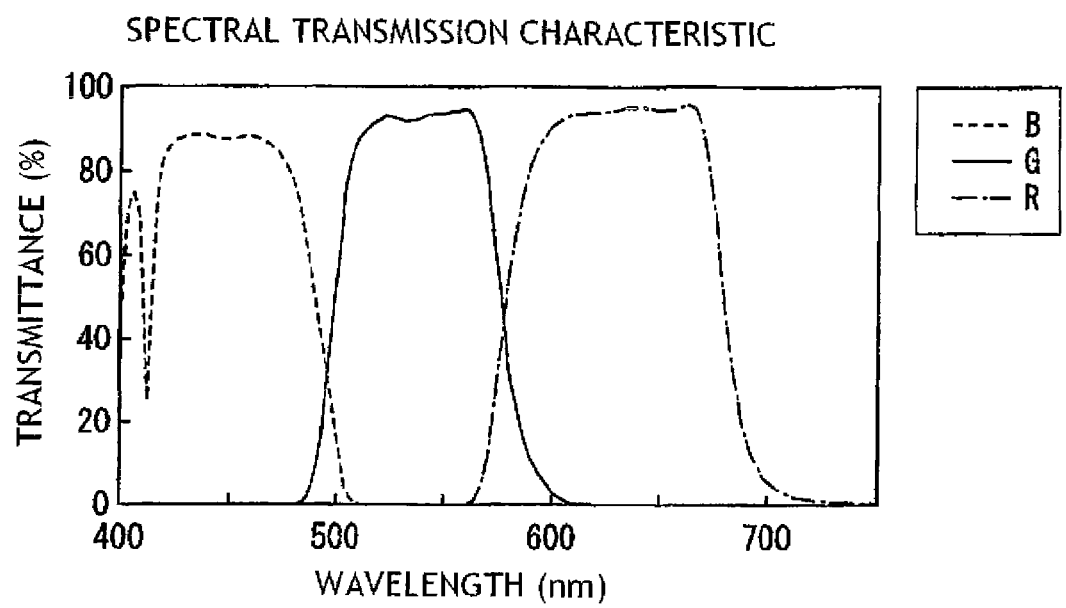
FIG. 20 is a characteristic graph illustrating a spectral characteristic of a general color separation optical system.
Figure 21:
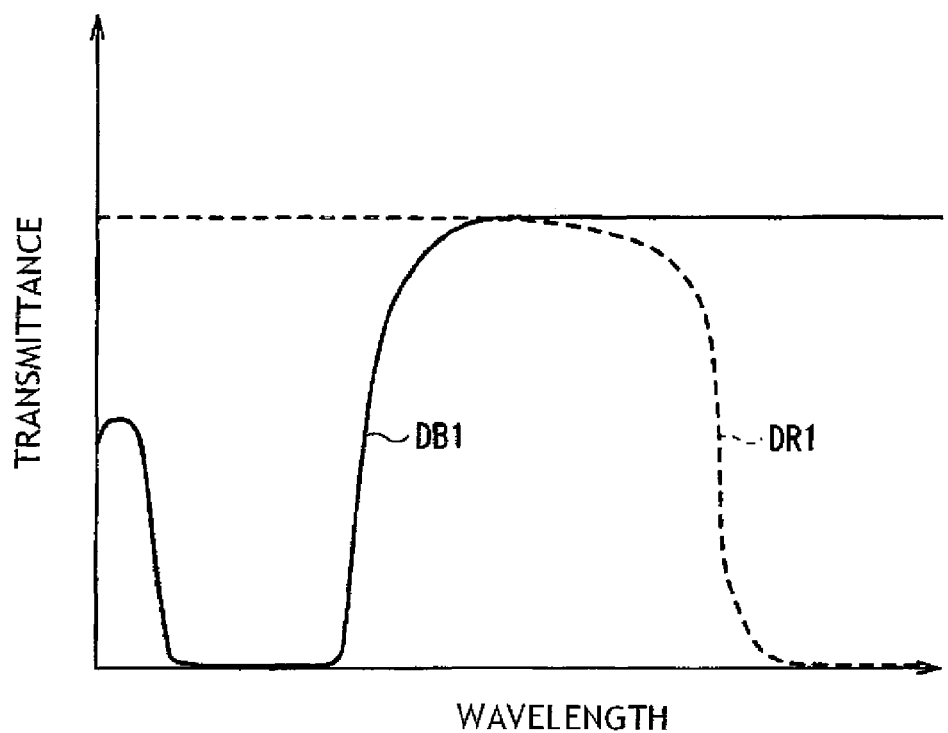
FIG. 21 is a characteristic graph illustrating an example of a characteristic of a dichroic film used in a color separation optical system.
Figure 22:
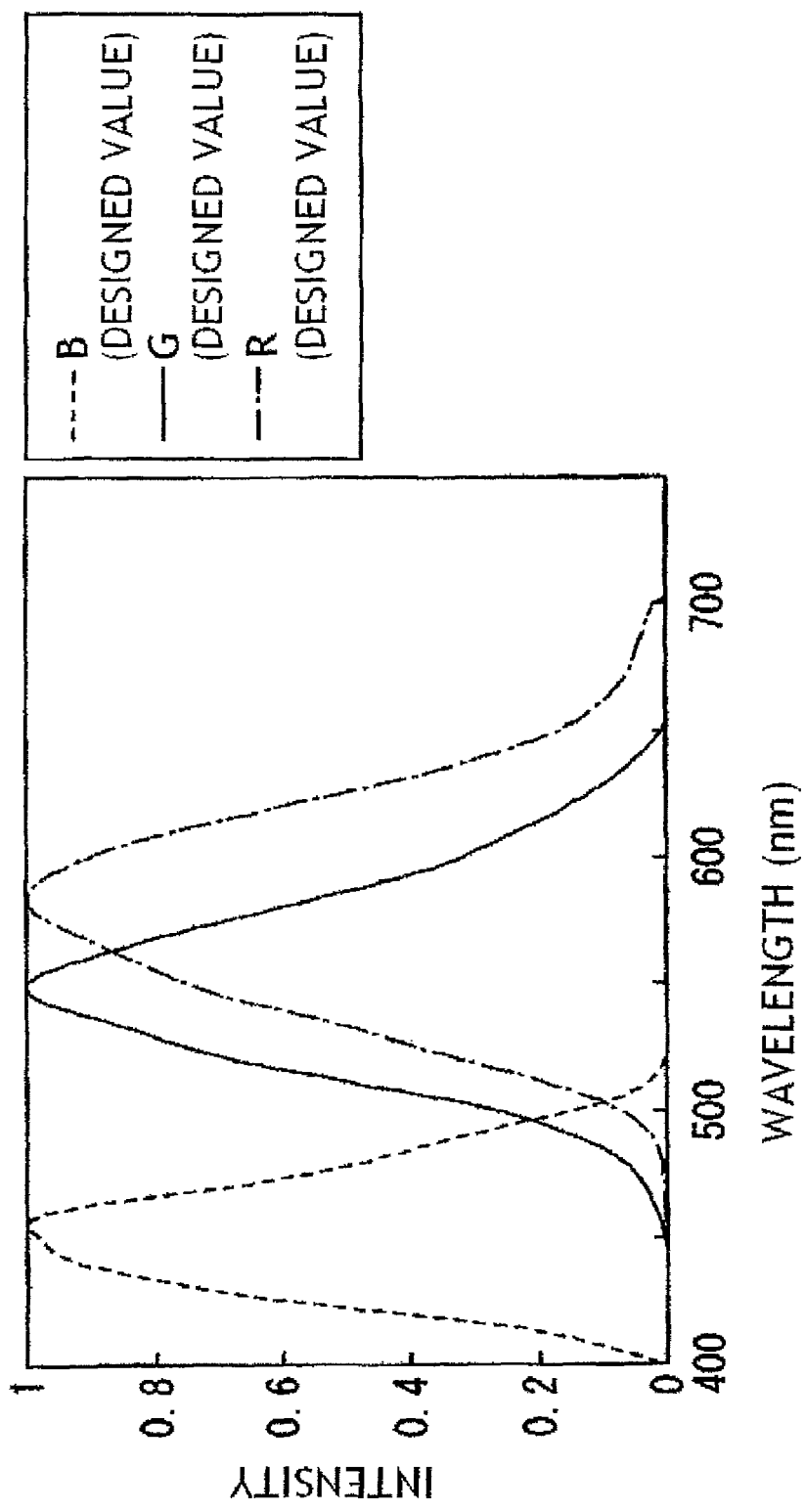
FIG. 22 is a characteristic graph illustrating a spectral characteristic approximating an ideal characteristic of the color separation optical system.
Figure 23:
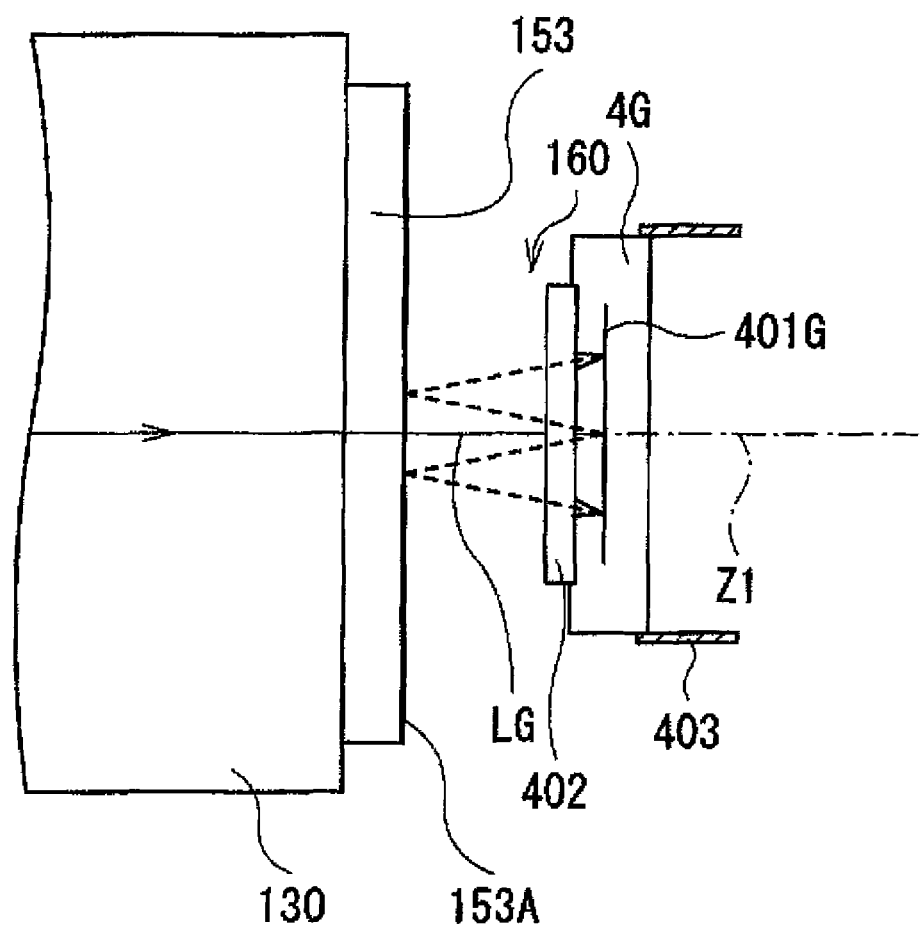
FIG. 23 is an explanatory view illustrating multiple reflections caused in the color separation optical system.
Figure 24:
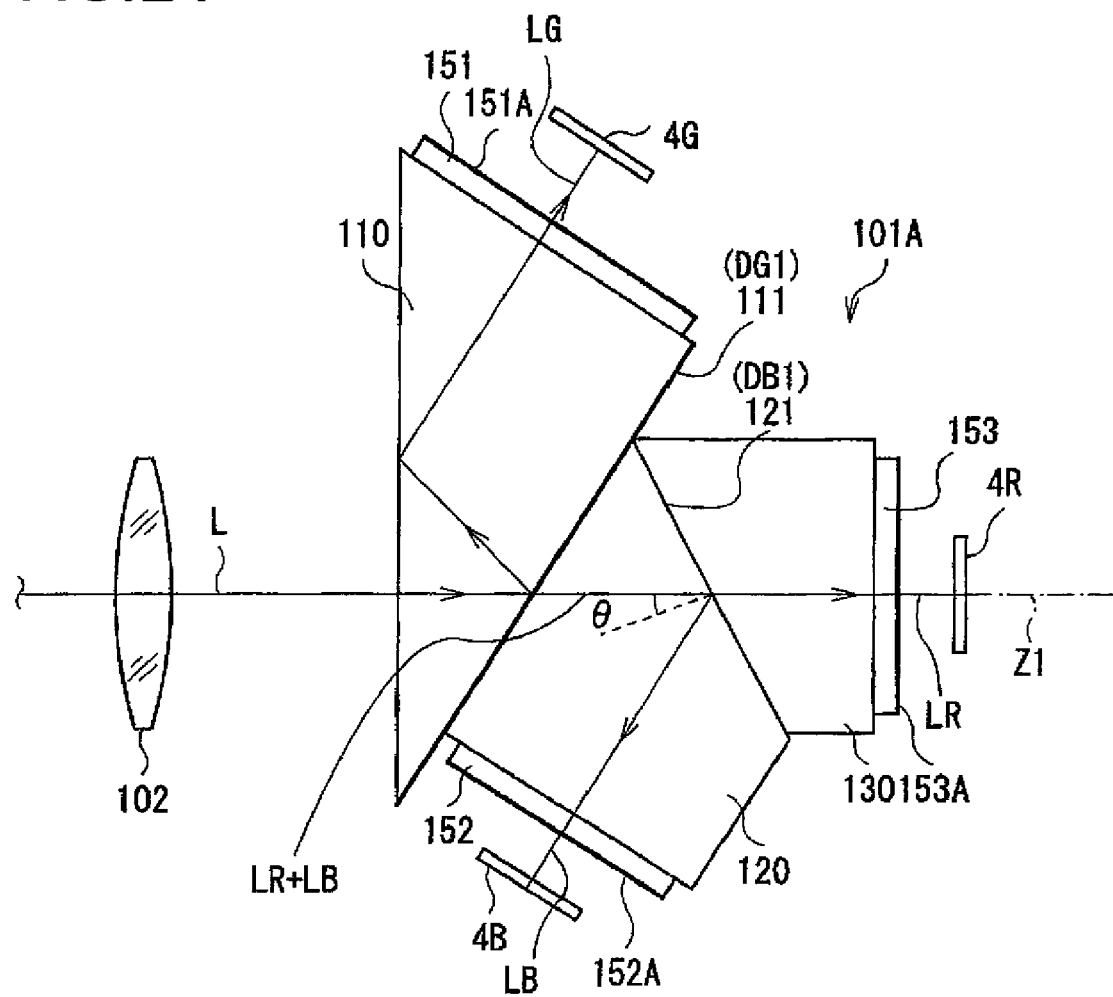
FIG. 24 is a cross-sectional view illustrating an example of the configuration of a gapless type color separation optical system.
Figure 25:
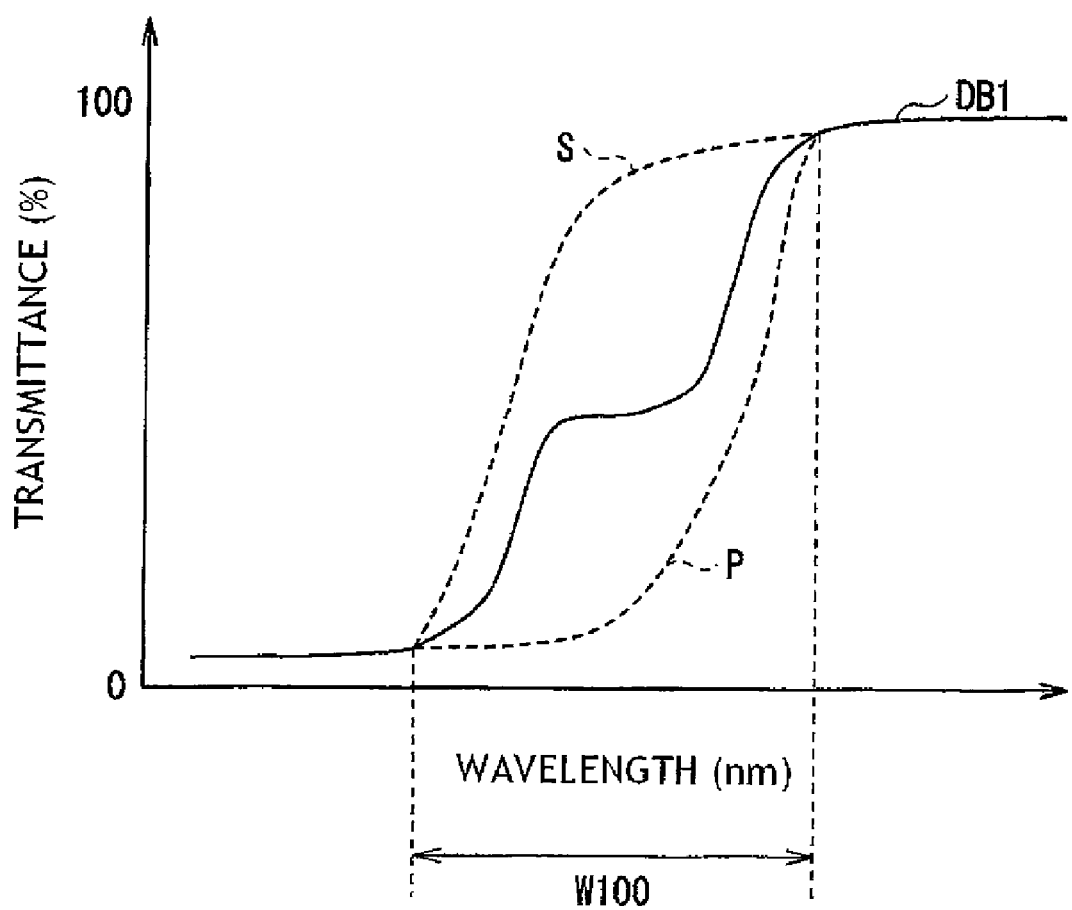
FIG. 25 is a characteristic graph illustrating an example of a spectral transmission characteristic of a dichroic film.

A green-reflecting dichroic film DG serving as a first dichroic film serving as a first dichroic film is formed on the second surface 12 of the first prism 10. The green-reflecting dichroic film DG is configured to reflect green light LG as a first color light component and to transmit blue light LB and red light LR. A reflection characteristic curve representing a reflectance to a wavelength of the green-reflecting dichroic film DG has such a shape that the gradient at each point of the reflection characteristic curve changes along a short-wavelength-side ideal spectral characteristic curve of green light and a long-wavelength-side ideal spectral characteristic curve of green light determined by converting the chromaticity coordinates of three primary colors of a color reproduction medium thereinto and performing a linear transformation of a color matching function in an XYZ color coordinate system. The term "ideal characteristic" means a "given target spectral characteristic" and is, e.g., a characteristic illustrated in FIG. 19. The "ideal characteristic" can be obtained by converting the chromaticity coordinates of three primary colors of a color reproduction medium thereinto and performing a linear transformation of a color matching function in an XYZ color coordinate system. Additionally, an ideal characteristic itself represented by a color matching function in an RGB color coordinate system can be used as an "ideal characteristic".

Figure 2A:
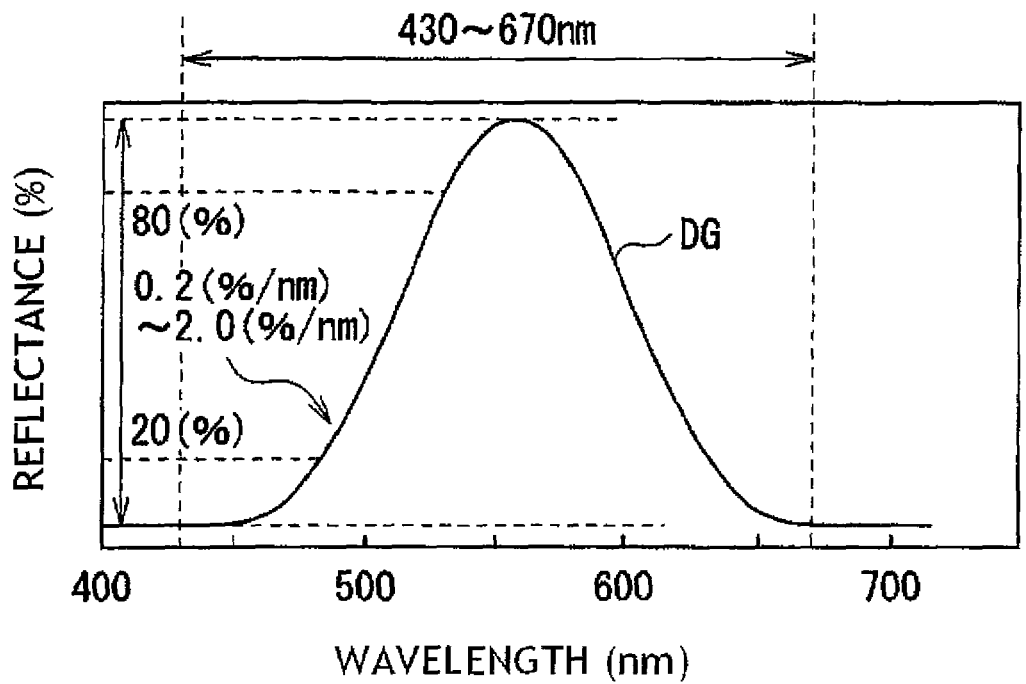
FIG. 2A is an explanatory graph illustrating a short wavelength side characteristic of a green-reflecting dichroic film DG used in the color separation optical system according to the first embodiment of the invention.
Figure 2B:
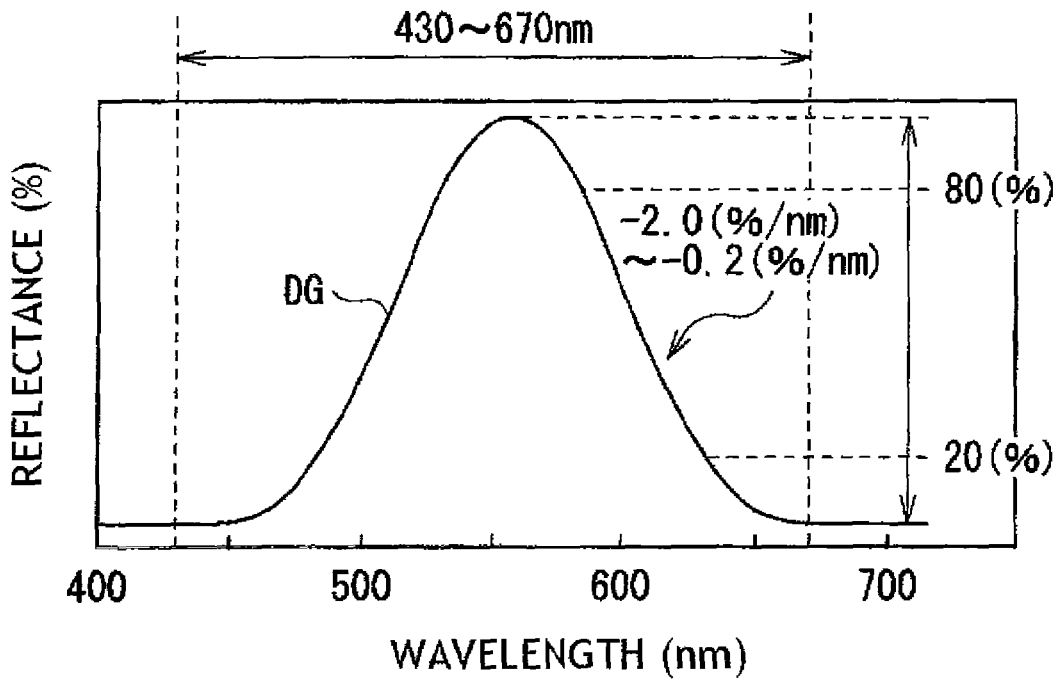
FIG. 2B is an explanatory graph illustrating a long wavelength side characteristic of the green-reflecting dichroic film DG used in the color separation optical system according to the first embodiment of the invention.

FIGS. 2A and 2B each illustrate an example of the reflection characteristic curve of the green-reflecting dichroic film DG in the example of the apparatus of the configuration illustrated in FIG. 1. The green-reflecting dichroic film DG is shaped so that the gradient at each point on the reflection characteristic curve changes along a short-wavelength-side of the ideal green spectral characteristic curve, in which the reflectance changes from a low value to a high value, in a range of a wavelength from 430 nm to 670 nm, as illustrated in FIG. 2A. More particularly, preferably, the reflection characteristic curve in a range of a wavelength from 430 nm to 670 nm is shaped so that the average gradient of a part, in which the reflectance changes from 20% to 80% between the lowest reflectance and the highest reflectance, is equal to or more than 0.2 (%/nm) and is equal to or less than 2.0 (%/nm).

The green-reflecting dichroic film DG is shaped so that the gradient at each point on the reflection characteristic curve changes along a long-wavelength-side of the ideal green spectral characteristic curve, in which the reflectance changes from a high value to a low value, in a range of a wavelength from 430 nm to 670 nm, as illustrated in FIG. 2B. More particularly, preferably, the reflection characteristic curve in a range of a wavelength from 430 nm to 670 nm is shaped so that the average gradient of a part, in which the reflectance changes from 80% to 20% between the lowest reflectance and the highest reflectance, is equal to or more than −2.0 (%/nm) and is equal to or less than −0.2 (%/nm).

The second prism 20 has a first surface 21, a second surface 22, and a third surface 23. The color separation optical system 1 is provided with no air gap between the first prism 10 and the second prism 20. The second surface 12 of the first prism 10 and the first surface 21 of the second prism 20 are closely and directly attached to each other via the green-reflecting dichroic film DG. That is, a surface of the first prism 10, on which the green-reflecting dichroic film DG is provided, is the light incidence surface of the second prism 20 are intimately attached to each other without providing an air gap therebetween.

The third surface 23 of the second prism 20 is a light exit surface. A trimming filter 52 is provided on the exit surface. The trimming filter 52 is not provided with a dichroic film for adjusting a characteristic, similarly to the trimming filter 51 in the first prism 10. Instead, an antireflection film 52AR for preventing ghost flare is formed on the light exit surface of the trimming filter 52. Incidentally, the antireflection film 52AR can be formed directly on the third surface 23 of the second prism 20 without providing the trimming filter 52.

A blue-reflecting dichroic film DB as the second dichroic film is formed on the second surface 22 of the second prism 20. The blue-reflecting dichroic film DB is configured to reflect blue light LB as the second color light component, and to transmit red light LR. Preferably, the transmission characteristic curve of the blue-reflecting dichroic film DB is shaped so that the gradient at each point on the transmission characteristic curve changes along the short wavelength side part of the ideal red spectral characteristic curve determined by converting the chromaticity coordinates of three primary colors of a color reproduction medium thereinto and performing a linear transformation of a color matching function in an XYZ color coordinate system. Incidentally, the term "ideal characteristic" means a "given target spectral characteristic" and is, e.g., a characteristic illustrated in FIG. 19. The "ideal characteristic" can be obtained by converting the chromaticity coordinates of three primary colors of a color reproduction medium thereinto and performing a linear transformation of a color matching function in the XYZ color coordinate system. Additionally, the ideal characteristic itself represented by a color matching function in an RGB color coordinate system can be used as an "ideal characteristic".

Figure 3:
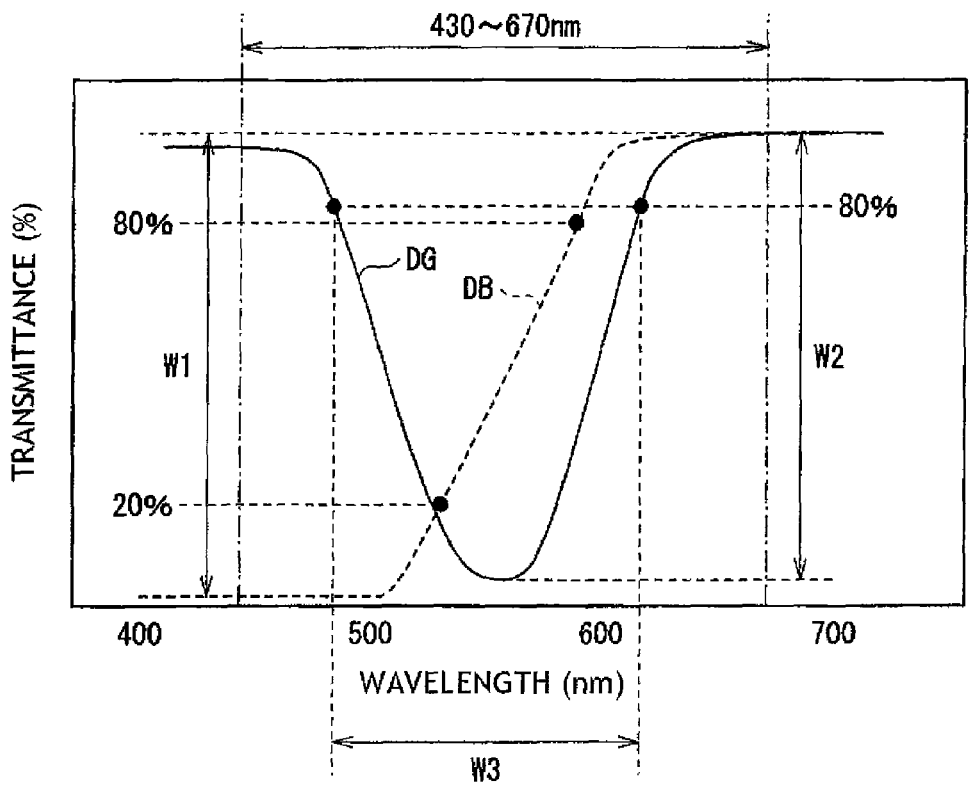
FIG. 3 is an explanatory graph illustrating a characteristic of a blue-reflecting dichroic film DB used in the color separation optical system according to the first embodiment of the invention.

Preferably, the blue-reflecting dichroic film DB has a characteristic associated with the characteristic of the green-reflecting dichroic film DG. FIG. 3 illustrates an example of a transmission characteristic curve of the blue-reflecting dichroic film DB used in the color separation optical system illustrated in FIG. 1. The transmission characteristic curve representing the wavelength versus transmittance characteristic of the blue-reflecting dichroic film DB has a part in which the transmittance rises from 20% to 80% within a transmittance range W1 between the lowest transmittance and the highest transmittance. Preferably, this part, in which the transmittance of the blue-reflecting dichroic film DB rises from 20% to 80%, is included in a predetermined wavelength region W3 associated with the characteristic of a green-reflecting dichroic film DG. The predetermined wavelength region W3 is a region between two wavelength points corresponding to a transmittance of 80% in a transmittance range W2 between the lowest transmittance and the highest transmittance of the transmission characteristic curve of the green-reflecting dichroic film DG. Incidentally, the values of "20%" and "80%" in FIG. 3 represent proportions of the difference between the lowest transmittance and the highest transmittance.

The third prism 30 has a first surface 31, and a second surface 32. The third prism 30 is connected to the second prism 20 via the blue-reflecting dichroic film DB. More particularly, the second surface 22 of the second prism 20 is connected to the first surface 31 of the third prism 30 via the blue-reflecting dichroic film DB. The second surface 32 of the third prism 30 is a light exit surface. A trimming filter 53 is provided on this exit surface. A dichroic film for adjusting a characteristic is not provided on the trimming filter 53, similarly to the trimming filter 51 on the first prism 10. Instead, an antireflection film 53AR for preventing ghost flare is formed on the light exit surface of the trimming filter 53. Incidentally, the antireflection film 53AR may be formed directly on the second surface 32 of the third prism 30 without the trimming filter 53.

An IR cut filter 3 is arranged on a front side of the first prism 10. Preferably, the IR cut filter 3 is constituted by an absorption type filter having a characteristic, which approximates a visibility curve, in order to more easily obtain a characteristic close to the ideal spectral characteristic. Further, in a case where infrared light cannot sufficiently been removed only by the absorption type filter, the IR cut filter 3 further includes a coating type infrared cut filter which cuts off infrared light. FIG. 1 illustrates an example of a configuration in which a film 3R is coated on a plate-like absorption type filter. Incidentally, the IR cut filter 3 may be provided at the side of the light exit surface of the prism (the third prism 30 in the case illustrated in FIG. 1), from which red light is taken out, instead of the front side of the first prism 10.

Additionally, although not shown, an ultraviolet cut filter of the absorption type or the coating type, which is placed at a more front side than the first prism 10 and cuts off ultraviolet light, can be further provided in the color separation optical system 1.

Next, an operation of the image pickup apparatus according to the present embodiment, more specifically, an optical operation and advantages of the color separation optical system 1 are described below.

In this imaging apparatus, object light coming from an object (not shown) irradiated with light from a light source (not shown) is incident on the color separation optical system 1 through the imaging lens 2. The color separation optical system 1 separates the incident light L into three color light components, i.e., blue light LB, red light LR, and green light LG. More particularly, first, the green light LG of the incident light L is reflected by the green-reflecting dichroic film DG. Thus, the green light LG is taken out from the first prism 10 as a first color light component. Further, the blue light LB transmitted by the green-reflecting dichroic film DG is reflected by the blue-reflecting dichroic film DB and is taken out from the second prism 20 as a second color light component. Then, the red light LR transmitted by the green-reflecting dichroic film DG and the blue-reflecting dichroic film DB is taken out from the third prism 30 as a third color light component. The color light components, into which the incident light is separated by the color separation optical system 1, are incident on image pickup devices 4B, 4R, and 4C, respectively. The image pickup devices 4B, 4R and 4G output electric signals respectively corresponding to the incident color light components as imaging signals.

In the present embodiment, a curve representing a characteristic of the green-reflecting dichroic film DG is shaped along the ideal green spectral characteristic curve. A curve representing a characteristic of a blue-reflecting dichroic film DB is shaped along a short-wavelength-side part of the ideal red spectral characteristic curve. Thus, a characteristic close to the ideal spectral characteristic is obtained without using a trimming filter provided with a dichroic film provided on the exit surface of the prism. Consequently, there is no necessity for using the trimming filter provided with the dichroic film. Accordingly, the generation of ghost flare due to the dichroic film provided on the trimming filter is suppressed. Thus, an imaging system having an ideal spectral characteristic, which reduces ghost flare, can be implemented.

Further, according to the present embodiment, the characteristic of the blue-reflecting dichroic film DB is associated with the characteristic of the green-reflecting dichroic film DG. A part of the transmission characteristic curve of the blue-reflecting dichroic film DB, in which the transmittance changes from a low value to a high value, is included by the given wavelength region W3 associated with the characteristic of the green-reflecting dichroic film DG (see FIG. 3). Consequently, even in a case where a polarization separation is caused on the blue-reflecting dichroic film DB, the influence of the polarization separation is substantially confined in the given wavelength region W3 associated with the characteristic of the green-reflecting dichroic film DG. Thus, a characteristic close to the ideal spectral characteristic is obtained.

Hereinafter, a spectral characteristic obtained by the present embodiment is described based on an actual example of the design thereof.

Figure 4:
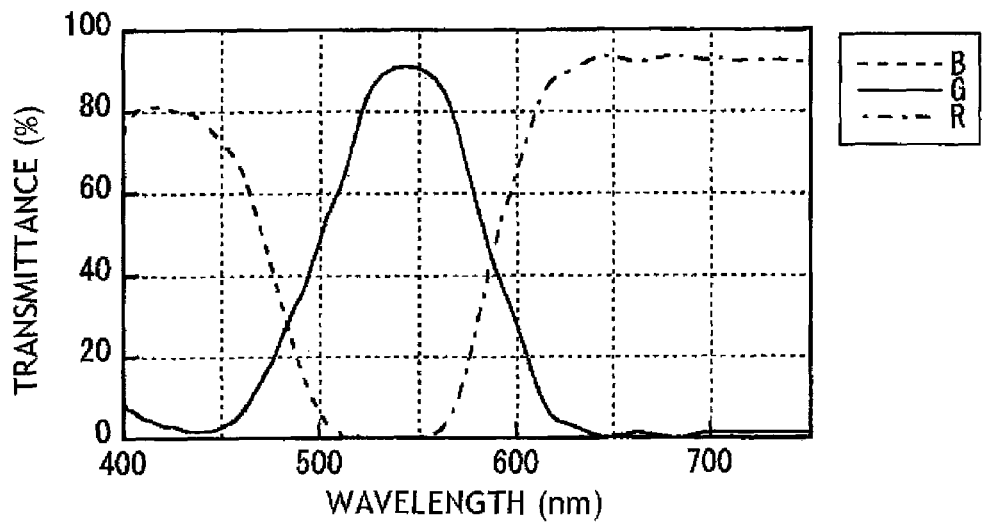
FIG. 4 is a characteristic graph illustrating a spectral characteristic of a prism portion in an image pickup apparatus according to the first embodiment of the invention.
Figure 5:
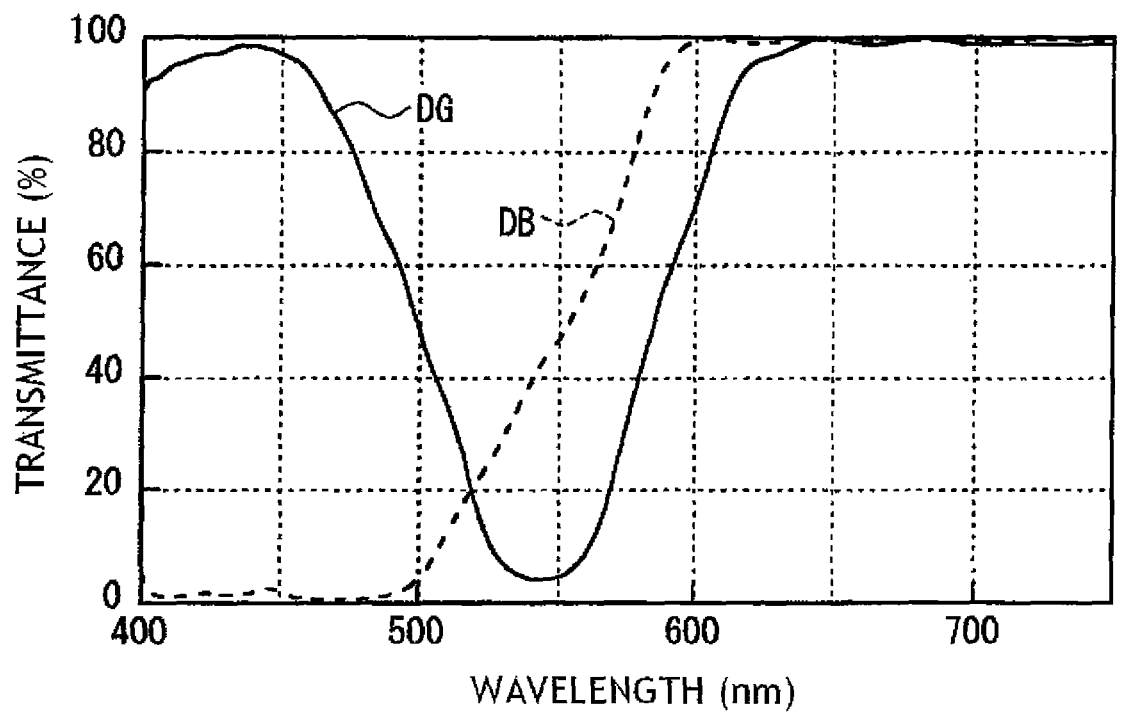
FIG. 5 is a characteristic graph illustrating a first example of the design of a dichroic film used in the color separation optical system according to the first embodiment of the invention.

FIG. 4 illustrates an example of the spectral transmittance characteristic of the entire prism portion (all of the first prism 10, the second prism 20, and the third prism 30) in the color separation optical system 1. Further, FIG. 5 illustrates a practical first example of the design of each of the green-reflecting dichroic film DG and the blue-reflecting dichroic film DB in the color separation optical system 1. The characteristics of the films, which are illustrated in FIG. 5, are obtained by the design of the films, which is indicated by numeric data concretely illustrated in FIGS. 6 and 7. Incidentally, the materials of the films, the number of layers, and the thickness of each of the layers according to the invention are not limited to those of examples illustrated in FIGS. 6 and 7.

Figure 10:
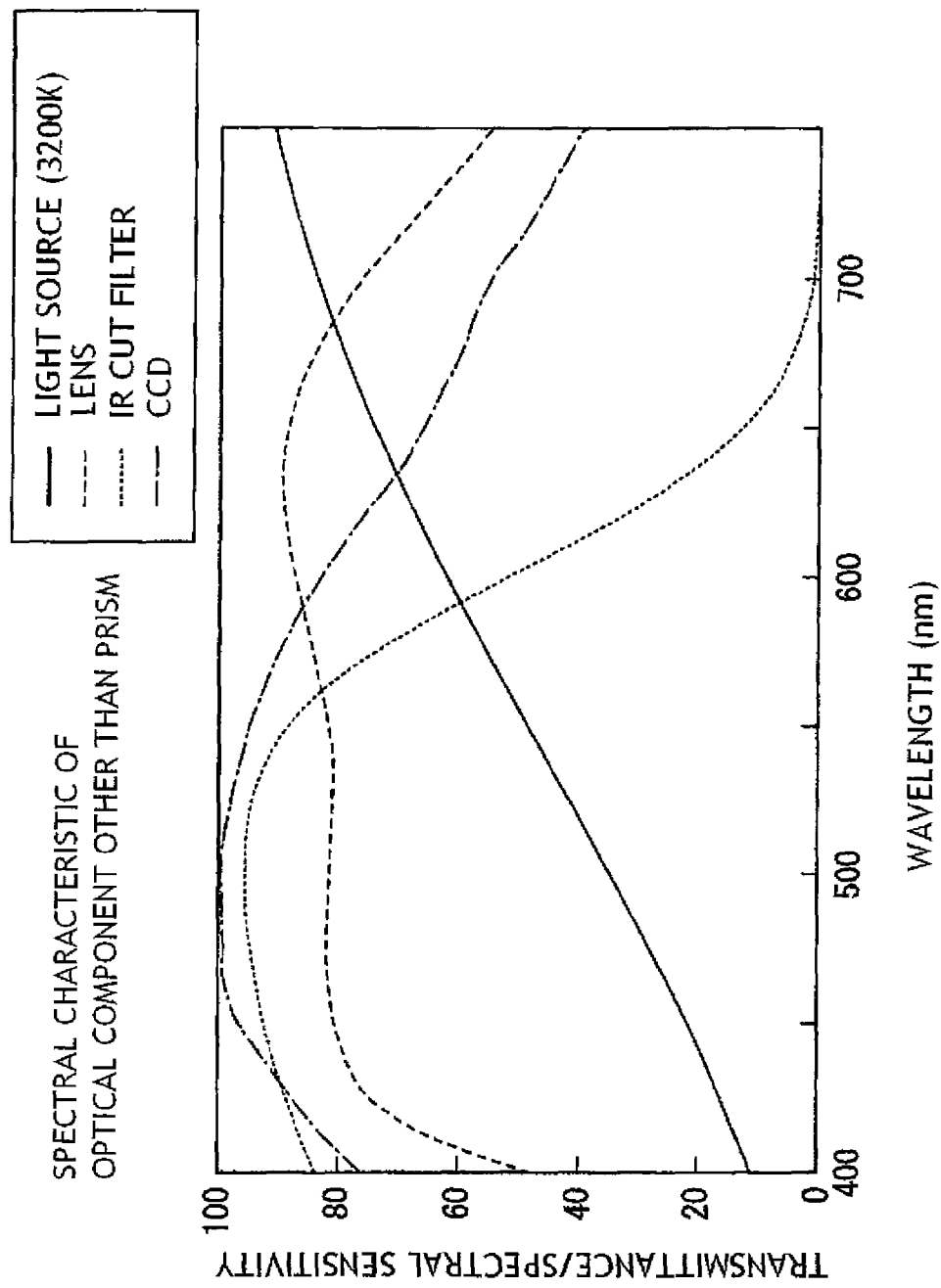
FIG. 10 is a characteristic graph illustrating a spectral characteristic of each of optical components other than the prism portion in the image pickup apparatus according to the first embodiment of the invention.
Figure 11:
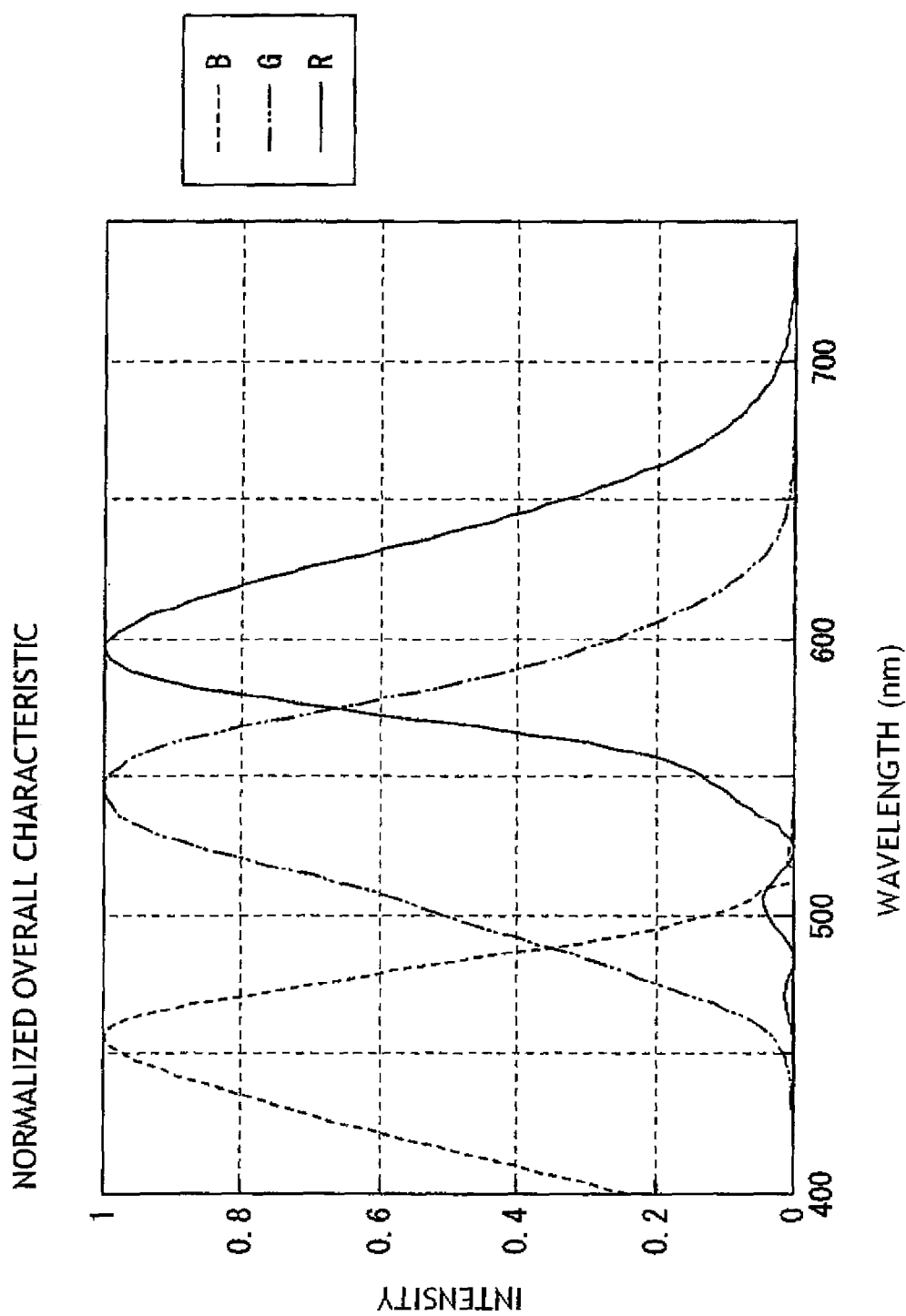
FIG. 11 is a characteristic graph illustrating a normalized overall spectral characteristic of the first embodiment of the invention.

FIG. 10 illustrates an example of a spectral characteristic of each of optical components other than the prism portion in the image pickup apparatus. FIG. 10 illustrates the characteristics of the optical components other than the prism portion, i.e., the characteristics of the light source (not shown) whose color temperature is 3200 K, the taking lens 2, the IR cut filter 3, and CCDs serving as the image pickup devices 4R, 4G, and 4B. FIG. 11 illustrates a normalized overall spectral characteristic of the entire optical system of the image pickup apparatus corresponding to each color light component. The normalized overall spectral characteristic of the entire optical system is obtained by putting together the characteristics of the optical components other than the prism portion illustrated in FIG. 10 and the characteristic of the entire prism portion illustrated in FIG. 4. The characteristic of the example of the design according to the present embodiment is close to the ideal characteristic, as compared with the characteristics of general goods.

Figure 8:
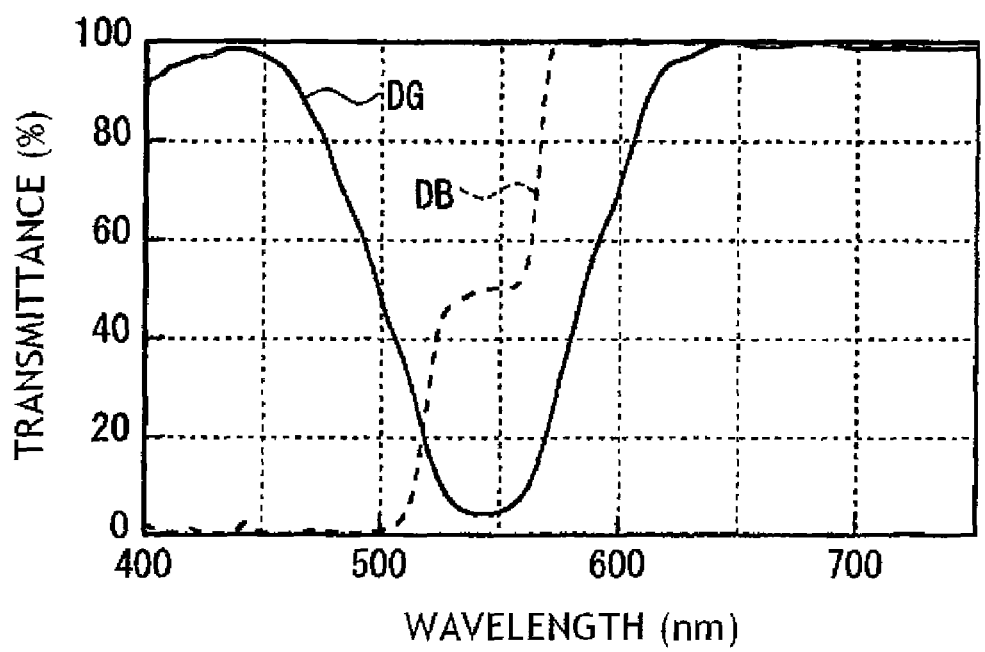
FIG. 8 is a characteristic graph illustrating a second example of the design of a dichroic film used in the color separation optical system according to the first embodiment of the invention.

FIG. 8 illustrates a second example of the design of each of the green-reflecting dichroic film DG and the blue-reflecting dichroic film DB used in the color separation optical system 1. The green-reflecting dichroic film DG in the case of the second example of the design illustrated in FIG. 8 is the same as that in the case of the first example of the design illustrated in FIG. 5. The characteristic of the blue-reflecting dichroic film DB in the case of the second example of the design illustrated in FIG. 8 differs from that of the blue-reflecting dichroic film DB in the case of the first example of the design illustrated in FIG. 5. The characteristic of the blue-reflecting dichroic film DB, which is illustrated in FIG. 8, is obtained by the design of the film, which is concretely represented by numeric data illustrated in FIG. 9. However, the materials of the film, the number of layers, and the thickness of each layer are not limited to those in the case of the example illustrated in FIG. 9. The characteristic of the blue-reflecting dichroic film DB may be set such that a curve representing a transition part from a low transmittance region to a high transmittance region in the characteristic of the film DB corresponding to each color light component rises like a step, as illustrated in FIG. 8.

As described above, the color separation optical system 1 according to the present embodiment can reduce ghost flare, as compared with the wavelength-selective techniques using the trimming filter provided with the dichroic film. In addition, a characteristic close to the ideal spectral characteristic can be obtained. Thus, the color reproducibility can be enhanced. Further, because a part of the transmission characteristic curve of the blue-reflecting dichroic film DB, in which the transmittance changes from a low value to a high value, is included by the given wavelength region associated with the green-reflecting dichroic film DG, the influence of polarization separation is almost confined in a given wavelength region associated with the green-reflecting dichroic film DG even when the polarization separation occurs at the blue-reflecting dichroic film DB. Consequently, even when polarization separation occurs at the blue-reflecting dichroic film DB, a characteristic close to the ideal spectral characteristic can be obtained. Further, the image pickup apparatus according to the present embodiment is adapted to output an imaging signal corresponding to each color light component obtained by the high performance color separation optical system 1 according to the present embodiment. Consequently, imaging can be achieved at high color reproducibility.

Second Embodiment

Next, a second embodiment of the invention is described hereinafter. Incidentally, components of the second embodiment, each of which is substantially the same as an associated component of the first embodiment, is designated with the same reference numeral. Thus, the description of such components is omitted.

Figure 12:
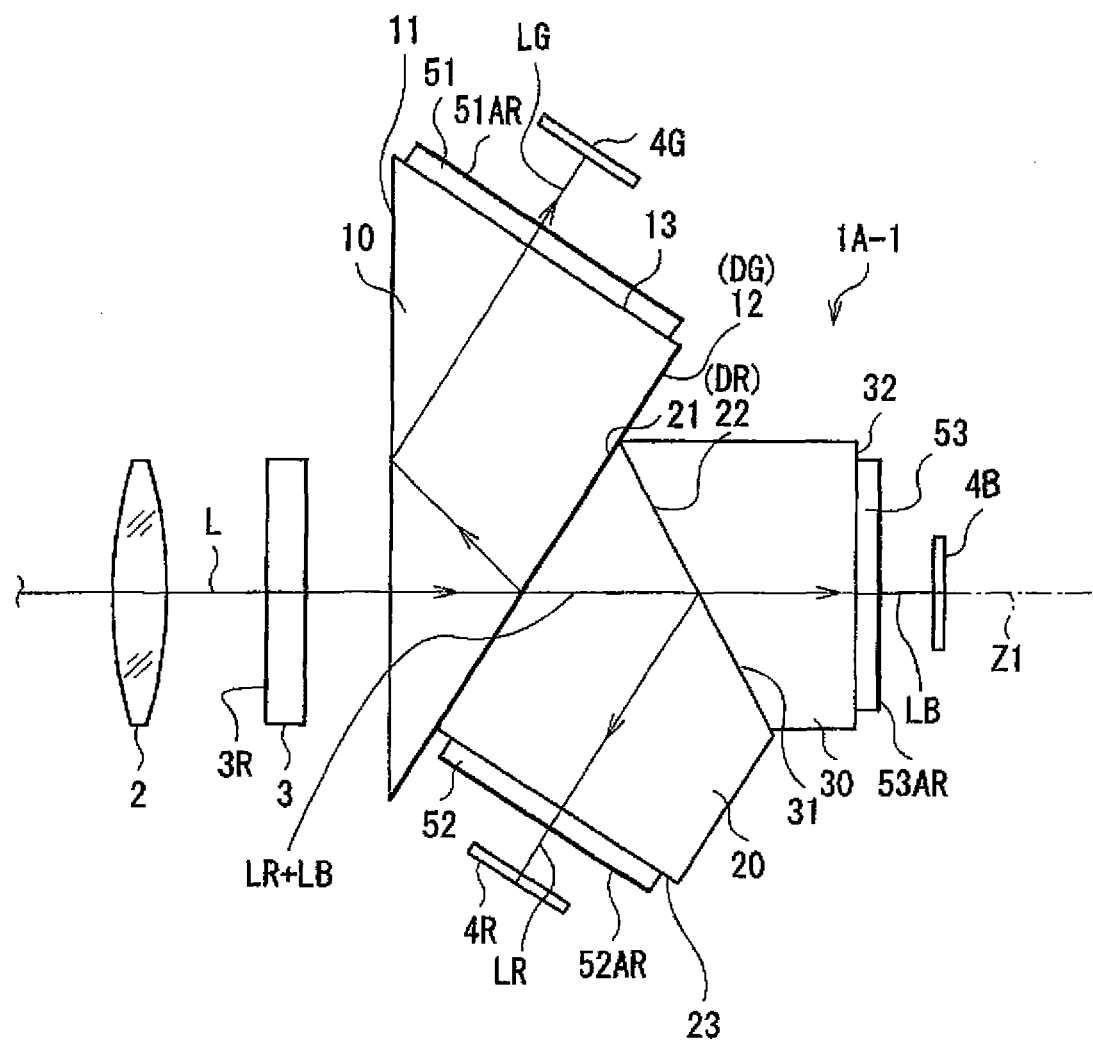
FIG. 12 is a cross-sectional view illustrating an example of the configuration of an image pickup apparatus having a color separation optical system according to a second embodiment of the invention.

FIG. 12 illustrates the configuration of a color separation optical system 1A-1 according to a second embodiment of the invention. The color separation optical system 1A-1 differs from the color separation optical system 1 illustrated in FIG. 1 in the order in which color light components are taken out. The color separation optical system 1A-1 is configured so that green light LG is taken out using the first prism 10, that red light LR is taken out using the second prism 20, and that blue light LB is taken out using the third prism 30.

In the color separation optical system 1A-1 according to the present embodiment, a green-reflecting dichroic film DG is formed as a first dichroic film on a second surface 12 of the first prism 10, similarly to the color separation optical system 1 illustrated in FIG. 1. The characteristic of the green-reflecting dichroic film DG according to the present embodiment is similar to that in the case of the color separation optical system 1 illustrated in FIG. 1. A reflection characteristic curve representing the characteristic of the green-reflecting dichroic film DG is similar to those illustrated in FIGS. 2A and 2B.

Although the blue-reflecting dichroic film DB is formed as the second dichroic film on the second surface 22 of the second prism 20 in the color separation optical system 1 illustrated in FIG. 1, a red-reflecting dichroic film DR is formed as the second dichroic film in the color separation optical system 1A-1 according to the present embodiment, instead of the blue-reflecting dichroic film DB. In the present embodiment, the red-reflecting dichroic film DR is configured to reflect red light LR as the second color light component, and to transmit blue light LB. Preferably, the reflection characteristic curve of the red-reflecting dichroic film DR is shaped so that the gradient at each point on the reflection characteristic curve changes along a short wavelength side part of the ideal red spectral characteristic curve determined by converting the chromaticity coordinates of three primary colors of a color reproduction medium thereinto and performing a linear transformation of a color matching function in an XYZ color coordinate system. Incidentally, the term "ideal characteristic" means a "given target spectral characteristic" and is, e.g., a characteristic illustrated in FIG. 19. The "ideal characteristic" can be obtained by converting the chromaticity coordinates of three primary colors of a color reproduction medium thereinto and performing a linear transformation of a color matching function in the XYZ color coordinate system. Additionally, the ideal characteristic itself represented by a color matching function in an RGB color coordinate system can be used as an "ideal characteristic".

Figure 13:
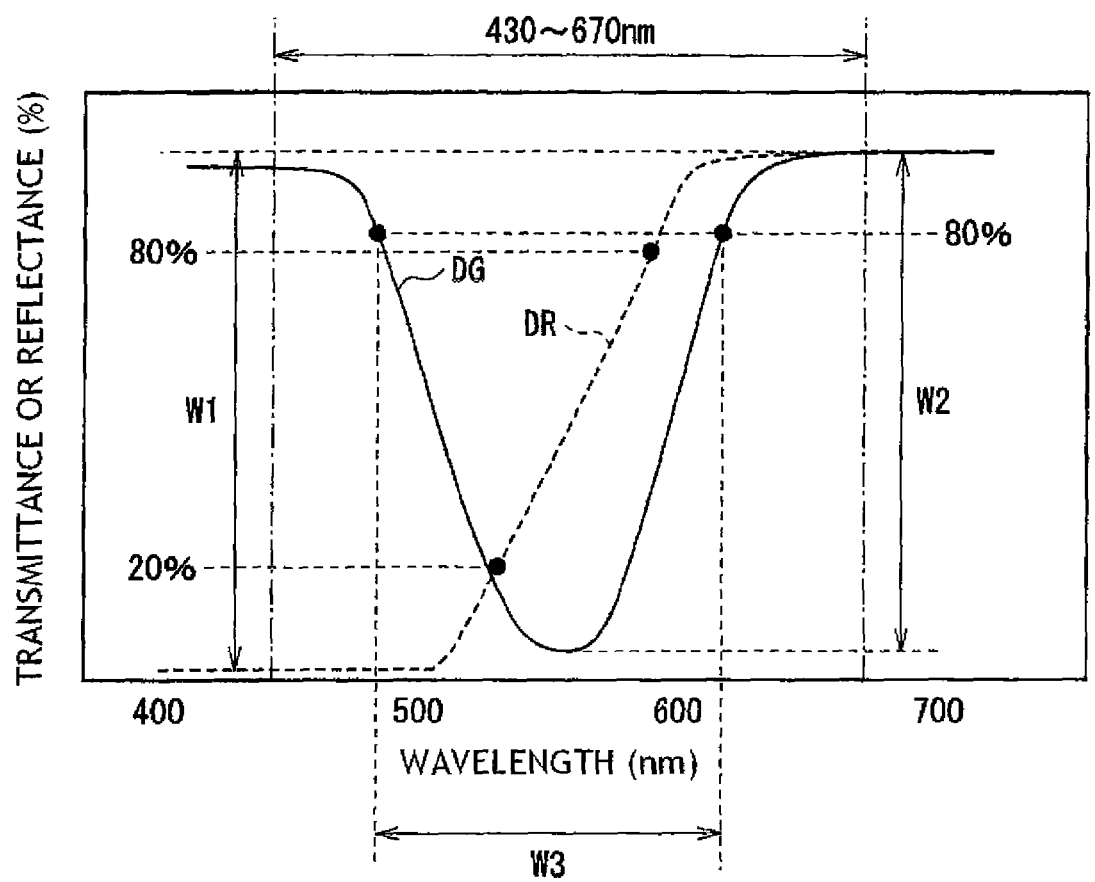
FIG. 13 is an explanatory graph illustrating a characteristic of a blue-reflecting dichroic film DB used in a color separation optical system according to the second embodiment of the invention.

Preferably, the characteristic of the red-reflecting dichroic film DR is associated with that of the green-reflecting dichroic film DG. FIG. 13 illustrates an example of the reflection characteristic curve representing the characteristic of the red-reflecting dichroic film DR in the configuration shown in FIG. 12. The reflection characteristic curve representing the reflectance with respect to the wavelength of the red-reflecting dichroic film DR has a part, in which the reflectance changes by rising from 20% to 80% in the range W1 of the reflectance between the lowest reflectance and the highest reflectance. Preferably, the part in the reflection characteristic curve of the red-reflecting dichroic film DR, in which the reflectance changes by rising from 20% to 80%, is included in a given wavelength region W3 associated with the characteristic of the green-reflecting dichroic film DG. The given wavelength region W3 is a region between two wavelength points corresponding to a transmittance of 80% in a transmittance range W2 between the lowest transmittance and the highest transmittance of the transmission characteristic curve of the green-reflecting dichroic film DG. Incidentally, the values of "20%" and "80%" in FIG. 13 represent proportions of the difference between the lowest transmittance and the highest transmittance.

In the color separation optical system 1A-1, first, green light LG of incident light L is reflected by the green-reflecting film DG and is taken out from the first prism 10 as a first color light component. Then, red light LR transmitted by the green-reflecting dichroic film DG is reflected by the red-reflecting dichroic film DR and is taken out from the second prism 20 as a second color light component. Further, blue light LB transmitted by the green-reflecting dichroic film DG and the red-reflecting dichroic film DR is taken out from the third prism 30 as a third color light component.

According to the present embodiment, a curve representing the characteristic of the green-reflecting dichroic film DG is shaped so that the characteristic thereof changes along the ideal green spectral characteristic curve. In addition, a curve representing the characteristic of the red-reflecting dichroic film DR is shaped so that the characteristic thereof changes along a short-wavelength-side part of the ideal red spectral characteristic curve. Thus, a characteristic close to the ideal spectral characteristic is obtained without using a trimming filter provided with a dichroic film provided on the exit surface of the prism. Consequently, there is no necessity for using the trimming filter provided with the dichroic film. Accordingly, the generation of ghost flare due to the dichroic film provided on the trimming filter is suppressed. Thus, an imaging system having an ideal spectral characteristic, which reduces ghost flare, can be implemented.

Further, according to the present embodiment, the characteristic of the red-reflecting dichroic film DR is associated with the characteristic of the green-reflecting dichroic film DG. A part of the reflection characteristic curve of the red-reflecting dichroic film DR, in which the reflectance changes from a low value to a high value, is included by the given wavelength region W3 associated with the characteristic of the green-reflecting dichroic film DG (see FIG. 13). Consequently, even in a case where a polarization separation is caused at the red-reflecting dichroic film DR, the influence of the polarization separation is substantially confined in the predetermined wavelength region W3 associated with the characteristic of the green-reflecting dichroic film DG. Thus, a characteristic close to the ideal spectral characteristic is obtained.

Third Embodiment

Next, a third embodiment of the invention is described hereinafter. Incidentally, components of the third embodiment, each of which is substantially the same as an associated component of the first or second embodiment, is designated with the same reference numeral. Thus, the description of such components is omitted.

Figure 14:
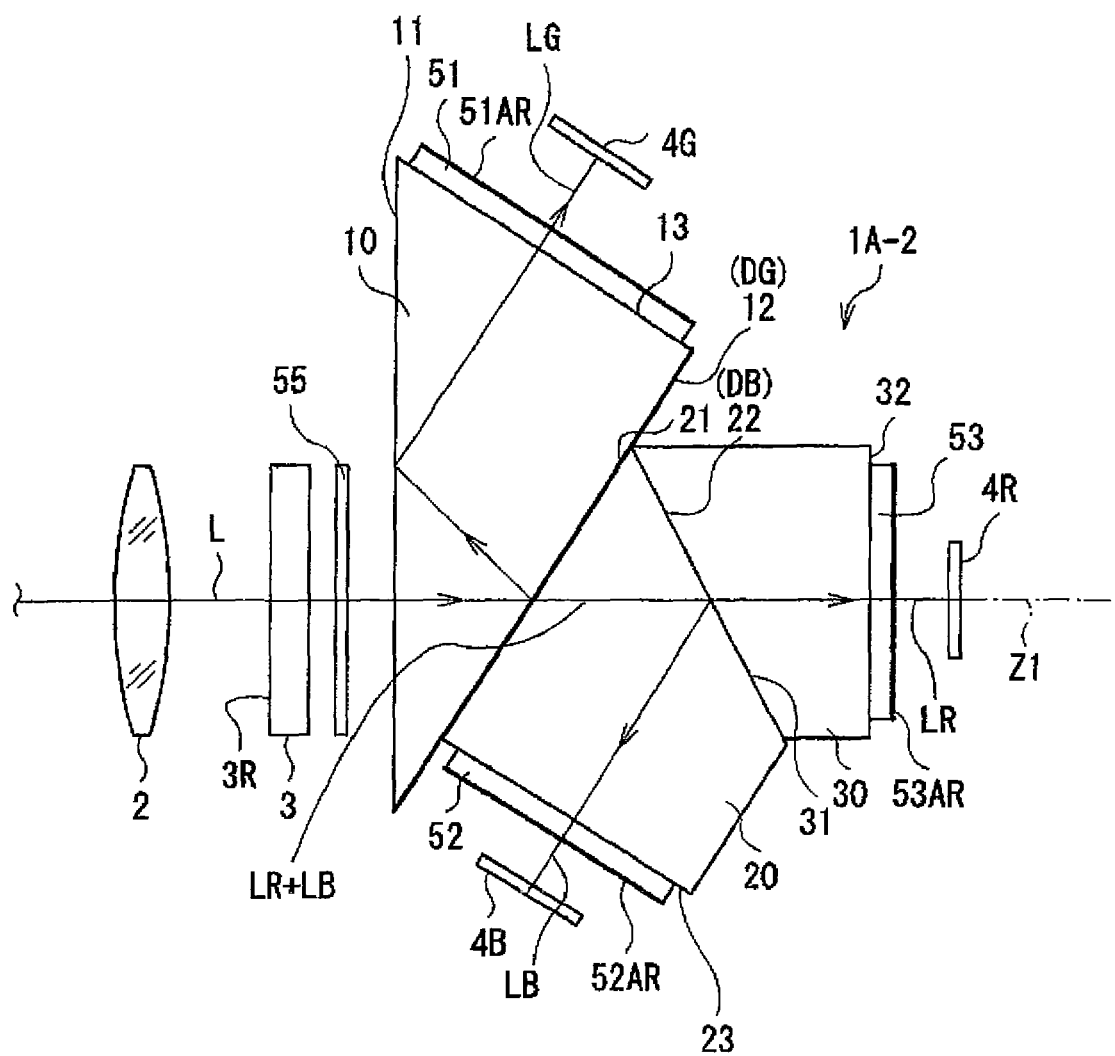
FIG. 14 is a cross-sectional view illustrating an example of the configuration of an image pickup apparatus having a color separation optical system according to a third embodiment of the invention.

FIG. 14 illustrates an example of the configuration of a color separation optical system 1A-2 according to the third embodiment of the invention. The color separation optical system 1A-2 further includes a depolarizing plate 55 placed at a more front side than the first prism 10, in comparison with the color separation optical system 1 illustrated in FIG. 1. The rest of the components of the color separation optical system 1A-2 are similar to the associated components of the color separation optical system 1 illustrated in FIG. 1. The depolarizing plate 55 is used to depolarize polarization in a specific direction of incident light.

Figure 15:
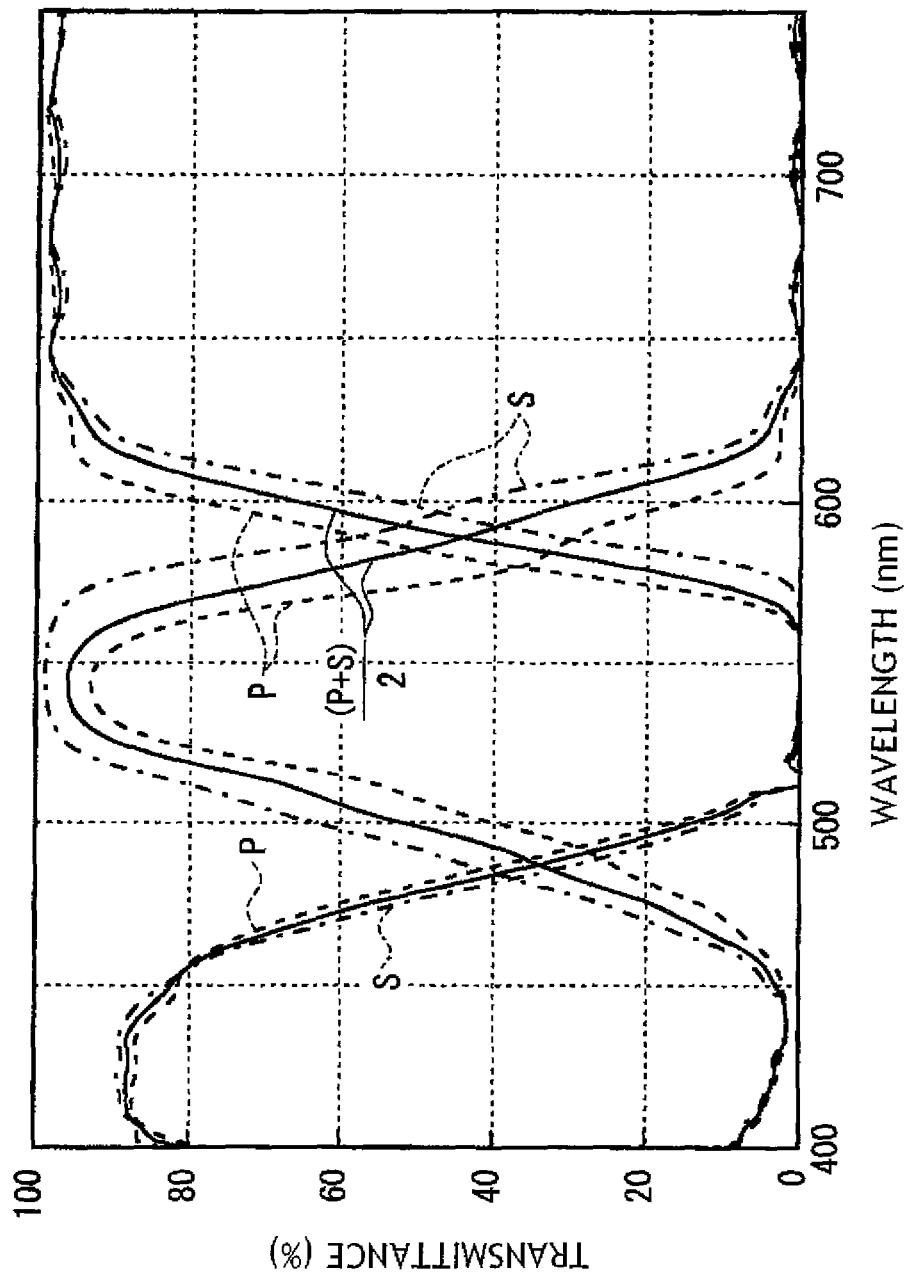
FIG. 15 is a characteristic graph illustrating a spectral characteristic of a prism portion in an image pickup apparatus according to the third embodiment of the invention.

FIG. 15 illustrates an example of a spectral transmission characteristic of the entire prism portion (all of the first prism 10, the second prism 20, and the third prism 30) corresponding to each polarization component in a case where the depolarizing plate 55 is not provided in the color separation optical system. In a case where components of incident light are biased towards, e.g., a specific linearly polarized light component, a spectral characteristic is changed, as compared with a case where the incident light is in a non-polarized state. FIG. 15 illustrates characteristics in a case where each of linearly polarized components (P-polarized light and S-polarized light) orthogonal to each other is singly incident thereon as incident light. FIG. 15 illustrates a characteristic (designated with "(P+S)/2") in a case where incident light is in a non-polarized light. In the present embodiment, the depolarizing plate 55 is disposed at a more front side than the first prism 10. Thus, polarized light, which is polarized in a specific direction, of incident light is depolarized. Consequently, a stable spectral characteristic designated with "(P+S)/2" can be obtained, as illustrated in FIG. 15.

Incidentally, similarly, a depolarizing plate 55 may be provided at a more front side of the color separation optical system 1A-1 (see FIG. 12) according to the second embodiment of the invention than the first prism 10.

Fourth Embodiment

Next, a fourth embodiment of the invention is described hereinafter. Incidentally, the basic configuration of a color separation optical system according to the present invention is similar to that of the first embodiment.

The color separation optical system according to the present embodiment changes the characteristic of the trimming filter 53 provided at the side of an exit surface of a prism (third prism 30) in the color separation optical system 1 illustrated in FIG. 1, from which red light is taken out, to a characteristic of an absorption filter that transmits red light and cuts off blue light and green light. The remaining components of the color separation optical system according to the present embodiment are similar to the associated components of the color separation optical system 1 illustrated in FIG. 1.

Figure 16:
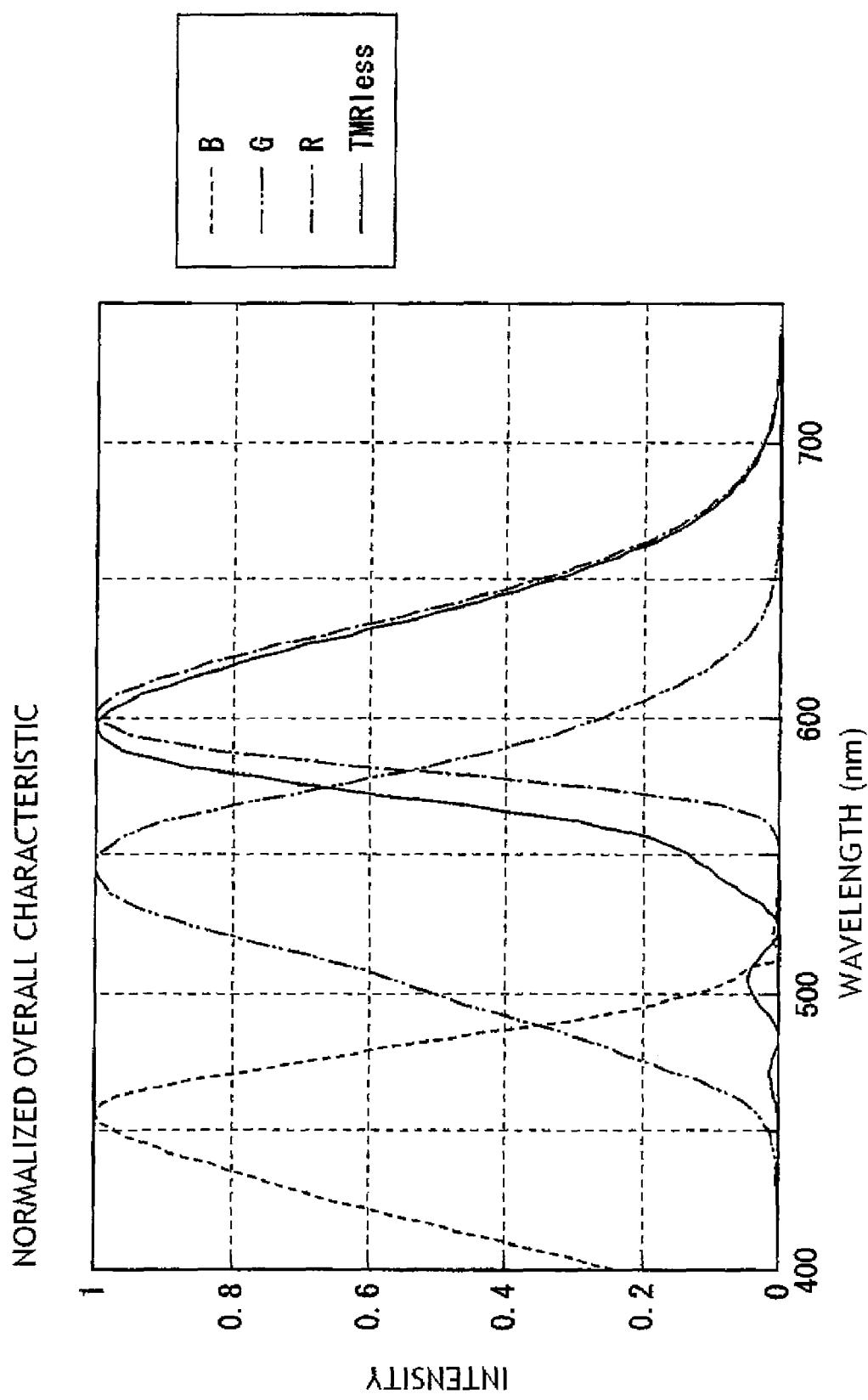
FIG. 16 is a characteristic graph illustrating a normalized overall spectral characteristic of a prism portion of a fourth embodiment of the invention.
Figure 17:
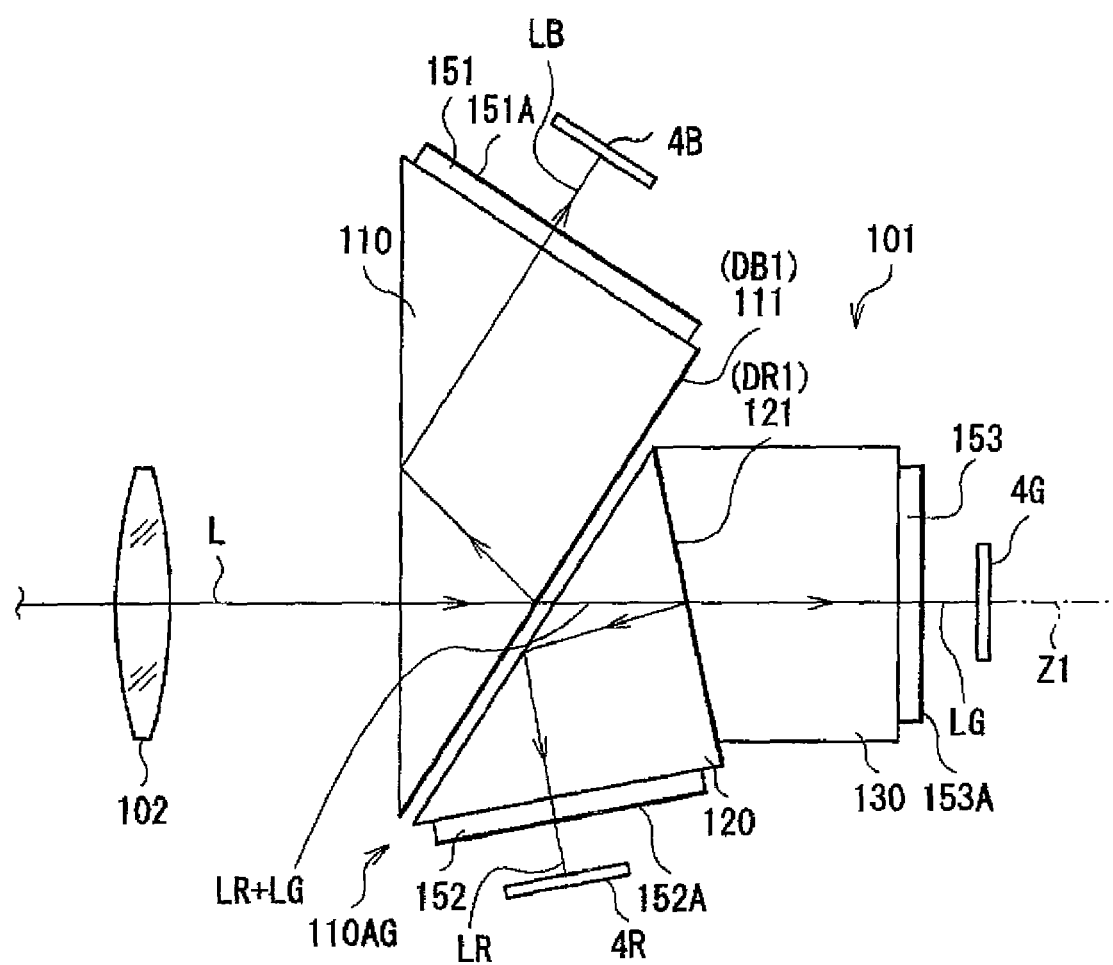
FIG. 17 is a cross-sectional view illustrating an example of the configuration of a color separation optical system.
Figure 18:
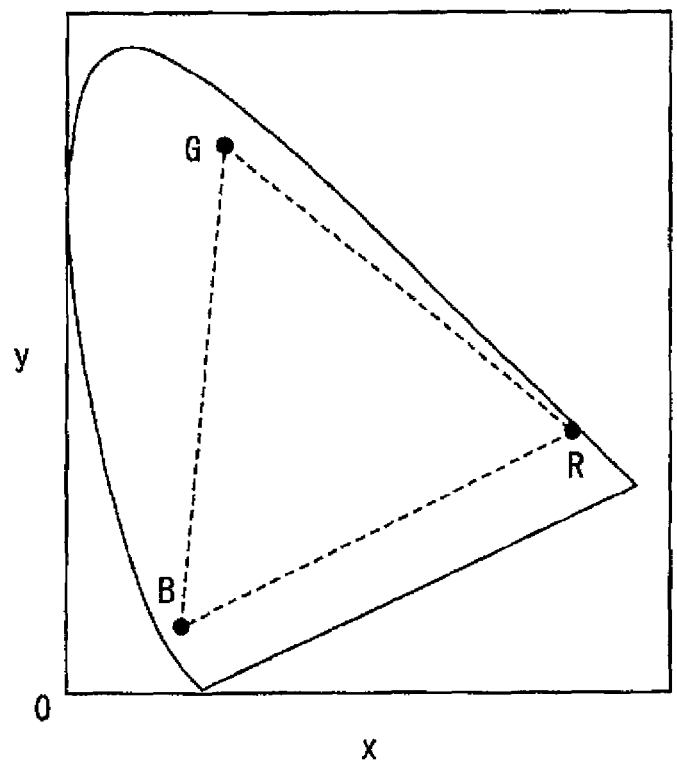
FIG. 18 is an xy-chromaticity diagram illustrating chromaticity coordinates of three primary colors for obtaining an ideal characteristic.

FIG. 16 illustrates normalized overall spectral characteristics (respectively designated with reference characters R, G, and B in FIG. 16) of a prism portion of the present embodiment of the invention. For comparison, FIG. 16 illustrates also a characteristic (which is indicated by a solid curve and is designated with reference character "TMRless" in FIG. 16) in a case where the characteristic of the trimming filter 53 is not changed to that of the absorption filter which transmits red light, and which cuts off blue light and green light. In the case where the characteristic of the trimming filter 53 is not changed to that of the absorption filter, blue light and green light filter into the image pickup device 4R for red light. Thus, unnecessary light is mixed thereinto. Consequently, color reproducibility is degraded. However, according to the present embodiment, the trimming filter 53 having a characteristic, in which blue light and green light are cut off, is provided on the exit surface side of the prism, from which red light is taken out. Accordingly, unnecessary light components can be prevented from filtering into the image pickup devices. In addition, color reproducibility can be improved.

Incidentally, similarly, in each of the system according to each embodiment, the trimming filter having a characteristic, in which blue light and green light are cut off, may be provided on the exit surface side of the prism, from which red light is taken out.

What is claimed is:

1. A color separation optical system for separating incident light into at least three color light components including green light, blue light, and red light, comprising, in order from a light incidence side:
    a first prism that includes a first dichroic film, from which first color light component reflected by the first dichroic film is taken out;
    a second prism that includes a second dichroic film, from which a second color light component transmitted by the first dichroic film and reflected by the second dichroic film is taken out; and
    a third prism from which a third color light component transmitted by the first and second dichroic films is taken out,
    wherein the first dichroic film reflects green light as the first color light component,
    the second dichroic film reflects blue light as the second color light component, and
    a reflection characteristic curve representing a reflectance-to-wavelength characteristic of the first dichroic film has a shape so that a gradient at each point of the reflection characteristic curve changes along a short-wavelength-side ideal spectral characteristic curve of green light and a long-wavelength-side ideal spectral characteristic curve of green light,
    a transmission characteristic curve representing a wavelength-to-transmittance characteristic of the second dichroic film has a part in which a transmittance rises from 20% to 80% within a transmittance range between the lowest transmittance and the highest transmittance, and
    the part, in which the transmittance rises from 20% to 80% within the transmittance range between the lowest transmittance and the highest transmittance, of a transmission characteristic curve corresponding to the second dichroic film is included in a given wavelength region interposed between wavelength points, at which a transmittance is equal to 80% between the lowest transmittance and the highest transmittance, on a transmission characteristic curve representing a wavelength-to-transmittance characteristic of the first dichroic film.

2. The color separation optical system according to claim 1, wherein a surface of the first prism of the first dichroic film and a light incidence surface of the second prism are closely attached to each other without providing an air gap therebetween.

3. The color separation optical system according to claim 1, wherein the first dichroic film is shaped so that the gradient at each point on the reflection characteristic curve changes along the short-wavelength-side ideal spectral characteristic curve of green light, in which the reflectance changes from a low value to a high value in a range of a wavelength from 430 nm to 670 nm, and
    the first dichroic film is shaped so that the gradient at each point on the reflection characteristic curve changes along the long-wavelength-side ideal spectral characteristic curve of green light, in which the reflectance changes from a high value to a low value, in a range of a wavelength from 430 nm to 670 nm.

4. The color separation optical system according to claim 3, wherein the reflection characteristic curve of the first dichroic film in a range of a wavelength from 430 nm to 670 nm has a shape configured so that an average gradient of a part, in which the reflectance changes from 20% to 80% between the lowest reflectance and the highest reflectance, is equal to or more than 0.2 (%/nm) and is equal to or less than 2.0 (%/nm) and
    the reflection characteristic curve of the first dichroic film in a range of a wavelength from 430 nm to 670 nm has a shape configured so that an average gradient of a part, in which the reflectance changes from 80% to 20% between the lowest reflectance and the highest reflectance, is equal to or more than −2.0 (%/nm) and is equal to or less than −0.2 (%/nm).

5. The color separation optical system according to claim 1, wherein the ideal spectral characteristic is an ideal characteristic represented by a color matching function in an RGB color coordinate system.

6. The color separation optical system according to claim 1, wherein ideal spectral characteristic is an ideal characteristic represented by converting chromaticity coordinates of three primary colors of a color reproduction medium thereinto and performing a linear transformation of a color matching function in an XYZ color coordinate system.

7. The color separation optical system according to claim 1, further comprising:
    a coating type infrared cut filter that is disposed at a more front side than the first prism and cuts off infrared light.

8. The color separation optical system according to claim 1, further comprising:
    an ultraviolet cut filter that is disposed at a more front side than the first prism and cuts off ultraviolet light.

9. The color separation optical system according to claim 1, wherein an antireflection film is applied to a light exit surface of at least one of the first, second and third prisms.

10. The color separation optical system according to claim 1, further comprising:
a depolarizing plate that is provided at a more front side than the first prism to depolarize light polarized in a specific direction of incident light.

11. The color separation optical system according to claim 1, further comprising:
an absorption filter (i) that is provided on a light exit surface side of a prism from which red light is taken out, (ii) that cuts off blue light and green light and (iii) that transmits red light.

12. An image pickup apparatus comprising:
the color separation optical system according to claim 1; and
an image pickup device (i) that is provided corresponding to each of the color light components, into which incident light is separated by the color separation optical system, (ii) outputs an electric signal corresponding to each of the color light components that are incident thereon.

13. A color separation optical system for separating incident light into at least three color light components including green light, blue light and red light, comprising in order from a light incidence side:
a first prism having a first dichroic film, from which a first color light component reflected by the first dichroic film is taken out;
a second prism having a second dichroic film, from which a second color light component transmitted by the first dichroic film and reflected by the second dichroic film is taken out; and
a third prism from which a third color light component transmitted by the first and second dichroic films is taken out,
wherein the first dichroic film reflects green light as the first color light component,
the second dichroic film reflects red light as the second color light component,
a reflection characteristic curve representing a reflectance-to-wavelength characteristic of the first dichroic film has a shape so that a gradient at each point of the reflection characteristic curve changes along a short-wavelength-side ideal spectral characteristic curve of green light and a long-wavelength-side ideal spectral characteristic curve of green light,
a reflection characteristic curve representing a wavelength-to-reflectance characteristic of the second dichroic film has a part in which a reflectance rises from 20% to 80% within a reflectance range between the lowest reflectance and the highest reflectance, and
the part, in which the reflectance rises from 20% to 80% within the reflectance range between the lowest reflectance and the highest reflectance, of the reflectance characteristic curve corresponding to the second dichroic film is included in a given wavelength region interposed between wavelength points, at which a transmittance is equal to 80% between the lowest transmittance and the highest transmittance, on a transmission characteristic curve representing a wavelength-to-transmittance characteristic of the first dichroic film.

14. The color separation optical system according to claim 13,
wherein a surface of the first prism of the first dichroic film and a light incidence surface of the second prism are closely attached to each other without providing an air gap therebetween.

15. The color separation optical system according to claim 13,
wherein the first dichroic film is shaped so that the gradient at each point on the reflection characteristic curve changes along the short-wavelength-side ideal spectral characteristic curve of green light, in which the reflectance changes from a low value to a high value in a range of a wavelength from 430 nm to 670 nm, and
the first dichroic film is shaped so that the gradient at each point on the reflection characteristic curve changes along the long-wavelength-side ideal spectral characteristic curve of green light, in which the reflectance changes from a high value to a low value, in a range of a wavelength from 430 nm to 670 nm.

16. The color separation optical system according to claim 15,
wherein the reflection characteristic curve of the first dichroic film in a range of a wavelength from 430 nm to 670 nm has a shape configured so that an average gradient of a part, in which the reflectance changes from 20% to 80% between the lowest reflectance and the highest reflectance, is equal to or more than 0.2 (%/nm) and is equal to or less than 2.0 (%/nm), and
the reflection characteristic curve of the first dichroic film in a range of a wavelength from 430 nm to 670 nm has a shape configured so that an average gradient of a part, in which the reflectance changes from 80% to 20% between the lowest reflectance and the highest reflectance, is equal to or more than −2.0 (%/nm) and is equal to or less than −0.2 (%/nm).

17. The color separation optical system according to claim 13,
wherein the ideal spectral characteristic is an ideal characteristic represented by a color matching function in an RGB color coordinate system.

18. The color separation optical system according to claim 13,
wherein ideal spectral characteristic is an ideal characteristic represented by converting chromaticity coordinates of three primary colors of a color reproduction medium thereinto and performing a linear transformation of a color matching function in an XYZ color coordinate system.

19. The color separation optical system according to claim 13, further comprising:
a coating type infrared cut filter that is disposed at a more front side than the first prism and cuts off infrared light.

20. The color separation optical system according to claim 13, further comprising:
an ultraviolet cut filter that is disposed at a more front side than the first prism and cuts off ultraviolet light.

21. The color separation optical system according to claim 13,
wherein an antireflection film is applied to a light exit surface of at least one of the first, second and third prisms.

22. The color separation optical system according to claim 13, further comprising:
a depolarizing plate that is provided at a more front side than the first prism to depolarize light polarized in a specific direction of incident light.

23. The color separation optical system according to claim 13, further comprising:
an absorption filter (i) that is provided on a light exit surface side of a prism from which red light is taken out, (ii) that cuts off blue light and green light and (iii) that transmits red light.

24. An image pickup apparatus comprising:

the color separation optical system according to claim 13; and an image pickup device (i) that is provided corresponding to each of the color light components, into which incident light is separated by the color separation optical system, (ii) outputs an electric signal corresponding to each of the color light components that are incident thereon.

* * * * *